United States Patent [19]
Noriyuki et al.

[11] Patent Number: 5,621,589
[45] Date of Patent: Apr. 15, 1997

[54] RECORDING AND/OR REPRODUCING APPARATUS

[75] Inventors: Koga Noriyuki, Chiba; Hisashi Hanzawa, Tokyo, both of Japan

[73] Assignee: Sony Corporation, Tokyo, Japan

[21] Appl. No.: 325,404

[22] PCT Filed: Mar. 9, 1994

[86] PCT No.: PCT/JP94/00378

§ 371 Date: Dec. 27, 1994

§ 102(e) Date: Dec. 27, 1994

[87] PCT Pub. No.: WO94/20958

PCT Pub. Date: Sep. 15, 1994

[30] Foreign Application Priority Data

Mar. 9, 1993 [JP] Japan .................................... 5-075326
Mar. 9, 1993 [JP] Japan .................................... 5-075327

[51] Int. Cl.⁶ ........................ G11B 15/665; G11B 15/675
[52] U.S. Cl. .............................. 360/96.5; 360/95; 360/85
[58] Field of Search .......................... 360/85, 96.1, 96.5, 360/96.6, 95

[56] References Cited

U.S. PATENT DOCUMENTS

| | | | |
|---|---|---|---|
| 4,789,912 | 12/1988 | Masuda et al. | 360/85 |
| 5,124,854 | 6/1992 | Iyota et al. | 360/96.6 |
| 5,291,352 | 3/1994 | Nagasawa | 360/85 |
| 5,327,306 | 7/1994 | Kondo et al. | 360/96.5 |
| 5,355,265 | 10/1994 | Kim | 360/96.6 |
| 5,361,180 | 11/1994 | Yamabuchi et al. | 360/85 |
| 5,414,573 | 5/1995 | Koga et al. | 360/93 |

Primary Examiner—Stuart S. Levy
Assistant Examiner—William J. Klimowicz
Attorney, Agent, or Firm—Jay H. Maioli

[57] ABSTRACT

A recording/reproducing apparatus for a tape-like recording medium housed in a tape cassette has a main chassis with a rotary head cylinder mounted thereon, and a subchassis coupled to the main chassis for sliding movement relative to the main chassis in directions toward and away from the rotary head cylinder. The subchassis has a pair of hub drive shafts and a plurality of guide rollers movable in a predetermined direction. The tape housed in the tape cassette loaded on the subchassis can be pulled out of the tape cassette and wound around the rotary head cylinder by moving the guide rollers in response to relative sliding movement of the main chassis and the subchassis. The tape can thus be loaded and unloaded manually.

26 Claims, 18 Drawing Sheets

RECORDING AND/OR REPRODUCING APPARATUS

TECHNICAL FIELD

The present invention relates to a recording, reproducing, and recording/reproducing apparatus suitable for use in recording, reproducing, and recording/reproducing information on and from a tape-like recording medium housed in a tape cassette.

BACKGROUND ART

Heretofore, tape players for use as recording, reproducing, and recording/reproducing apparatus have a plurality of guide rollers which can be moved in certain directions to effect a tape loading operation by pulling a predetermined length of tape from a tape cassette and winding the tape around a rotary head cylinder and a tape unloading operation by rewinding and storing the drawn tape into the tape cassette. The guide rollers are moved by drive forces produced by a motor. Rotation of hub drive shafts for rewinding the tape in the tape unloading operation is also caused by drive forces of the motor.

Since the tape loading and unloading operations of the conventional tape players are carried out by the drive forces of the motor, the tape players have a large number of constituent parts, are complex in structure, difficult to be reduced in size, highly costly, and have a high power requirement.

DISCLOSURE OF THE INVENTION

It is therefore an object of the present invention to provide a tape player which can manually be actuated easily in tape loading and unloading operations without the need for the drive forces of a motor, has a smaller number of constituent parts, is simpler in structure, and may be reduced in size and cost.

According to the present invention, a recording, reproducing, and recording/reproducing apparatus for a tape-like recording medium housed in a tape cassette comprises, as shown in FIGS. 1 through 3, for example, a main chassis with a rotary head cylinder mounted thereon, and a subchassis coupled to the main chassis for sliding movement relative to the main chassis in directions toward and away from the rotary head cylinder, the subchassis having a pair of hub drive shafts and a plurality of guide rollers movable in a predetermined direction, the arrangement being such that the tape housed in the tape cassette loaded on the subchassis can be pulled out of the tape cassette and wound around the rotary head cylinder by moving the guide rollers in response to relative sliding movement of the main chassis and the subchassis.

The guide rollers are movable to a predetermined position on the main chassis by sliding movement of the subchassis.

A first slide member and a second slide member are disposed on the subchassis, the guide rollers being mounted on the second slide member, the first slide member and the second slide member being slidable upon sliding movement of the subchassis.

A means is mounted on the subchassis for increasing sliding movement of the second slide member with respect to sliding movement of the subchassis.

The first slide member has a tape holding member for preventing the tape in the loaded tape cassette from riding onto the rotary head cylinder.

The tape holding member has opening means for opening a lid of the tape cassette.

The recording, reproducing, and recording/reproducing apparatus further comprises a holder for holding the tape cassette, the holder being vertically movably mounted on the subchassis, the holder being slidable with the subchassis with respect to the main chassis when the holder is in a lowered position.

The recording, reproducing, and recording/reproducing apparatus further comprises a frame with a lid member attached thereto, the frame being angularly movably mounted on the main chassis, and a link mechanism for vertically moving the holder in ganged relation to angular movement of the frame.

The link mechanism comprises a cam plate slidable by the frame, the cam plate having a first cam groove inclined for vertically moving the holder, the holder having a shaft engaging in the first cam groove, and a second cam groove contiguous to the first cam groove and extending parallel to a direction in which the subchassis and the main chassis slide with respect to each other.

The main chassis has a vertical cam groove for vertically moving the holder in coaction with the first cam groove.

The recording, reproducing, and recording/reproducing apparatus further comprises a pair of rocking levers angularly movable in response to sliding movement of the second slide member, the rocking levers having respective different tape guides.

The recording, reproducing, and recording/reproducing apparatus further comprises a tape rewinding mechanism disposed between the main chassis and the subchassis for rotating the supply hub drive shaft in a direction to rewind the tape in response to the sliding movement of the main chassis and the subchassis in a tape unloading operation.

The tape rewinding mechanism comprises a rack mounted on the main chassis, a first gear meshing with the rack, and a rocking gear rockable in response to rotation of the first gear based on the direction in which the first gear rotates, for meshing with a second gear coupled to the supply hub drive shaft.

The recording, reproducing, and recording/reproducing apparatus further comprises a damper mechanism, the rocking gear engaging the damper mechanism.

The recording, reproducing, and recording/reproducing apparatus further comprises an urging member for urging the subchassis to in a direction to discharge the tape cassette.

The subchassis has a tape holding member for preventing the tape in the loaded tape cassette from riding onto the rotary head cylinder.

The recording, reproducing, and recording/reproducing apparatus further comprises a tape rewinding mechanism disposed between the main chassis and the subchassis for rotating the supply hub drive shaft in a direction to rewind the tape in response to the sliding movement of the main chassis and the subchassis in a tape unloading operation.

The recording, reproducing, and recording/reproducing apparatus further comprises a brake mechanism disposed between the main chassis and the subchassis for braking the subchassis while the subchassis is sliding and releasing the subchassis after the sliding movement of the subchassis is completed.

According to the present invention, furthermore, a recording, reproducing, and recording/reproducing apparatus for a tape-like recording medium housed in a tape cassette comprises a main chassis with a rotary head cylinder mounted thereon, a subchassis coupled to the main chassis for sliding movement relative to the main chassis in directions toward and away from the rotary head cylinder, the subchassis having a pair of hub drive shafts and a plurality of guide rollers movable in a predetermined direction, and a holder for holding the tape cassette, the holder being vertically movable with respect to the subchassis, the holder being slidable with the subchassis when the holder is in a lowered position.

The recording, reproducing, and recording/reproducing apparatus further comprises means for integrally coupling the holder and the subchassis to each other when the holder is in the lowered position.

The means for integrally coupling comprises an engaging projection mounted on either one of the holder and the subchassis and an engaging recess defined in the other of the holder and the subchassis.

The recording, reproducing, and recording/reproducing apparatus further comprises a frame with a lid member attached thereto, the frame being angularly movably mounted on the main chassis, and a link mechanism for vertically moving the holder in ganged relation to angular movement of the frame.

The link mechanism comprises a cam plate slidable by the frame, the cam plate having a first cam groove inclined for vertically moving the holder, the holder having a shaft engaging in the first cam groove, and a second cam groove contiguous to the first cam groove and extending parallel to a direction in which the subchassis and the main chassis slide with respect to each other.

The main chassis has a vertical cam groove for vertically moving the holder in coaction with the first cam groove.

The holder has an engaging member for preventing the tape cassette held by the holder from being mounted and dismounted while the holder is sliding in unison with the subchassis relatively to the main chassis.

The recording, reproducing, and recording/reproducing apparatus further comprises a single lock mechanism for locking subchassis and the holder to the main chassis in a position in which the sliding movement of the subchassis and the holder is completed.

An actuating member is coupled to the subchassis through a resilient member, the actuating member being locked to the main chassis.

According to the present invention, furthermore, a recording, reproducing, and recording/reproducing apparatus for a tape-like recording medium housed in a tape cassette having a lid for closing a front side of the tape cassette comprises a main chassis with a rotary head cylinder mounted thereon, a subchassis coupled to the main chassis for sliding movement relative to the main chassis in directions toward and away from the rotary head cylinder, the subchassis having a pair of hub drive shafts for engaging a pair of hubs of the tape cassette, opening means for opening the lid of the tape cassette, and a plurality of guide rollers movable in a predetermined direction, and a holder for holding the inserted tape cassette, the holder being vertically movable with respect to the subchassis in response to opening and closing operation of a lid member, the holder being slidable with the subchassis when the holder is in a lowered position, the arrangement being such that when the holder is lowered, the lid of the tape cassette is opened by the opening means, and the tape can be pulled from a front opening of the tape cassette in the holder and wound around the rotary head cylinder by moving the guide rollers in response to relative sliding movement of the main chassis and the subchassis.

A first slide member and a second slide member are disposed on the subchassis, the guide rollers being mounted on the second slide member, the first slide member and the second slide member being slidable upon sliding movement of the subchassis.

The recording, reproducing, and recording/reproducing apparatus further comprises means on the subchassis for increasing sliding movement of the second slide member with respect to sliding movement of the subchassis.

The recording, reproducing, and recording/reproducing apparatus further comprises means for integrally coupling the holder and the subchassis to each other when the holder is in the lowered position.

The means for integrally coupling comprises an engaging projection mounted on either one of the holder and the subchassis and an engaging recess defined in the other of the holder and the subchassis.

According to the present invention, furthermore, a recording, reproducing, and recording/reproducing apparatus for a tape-like recording medium housed in a tape cassette having a lid for closing a front side of the tape cassette comprises a main chassis with a rotary head cylinder mounted thereon, a subchassis coupled to the main chassis for sliding movement relative to the main chassis in directions toward and away from the rotary head cylinder, the subchassis having a pair of hub drive shafts for engaging a pair of hubs of the tape cassette, an opening member disposed upstream in the directions parallel to a straight line interconnecting the hub drive shafts, for opening the lid of the tape cassette, and a plurality of guide rollers movable linearly, and a holder for holding the inserted tape cassette, the holder being vertically movable with respect to the subchassis in response to opening and closing operation of a lid member, the holder being slidable with the subchassis when the holder is in a lowered position, the arrangement being such that when the holder is lowered, the lid of the tape cassette is opened by the opening member, the opened lid is positioned between the opening member and the holder, the tape can be pulled from a front opening of the tape cassette in the holder and wound around the rotary head cylinder by moving the guide rollers in response to relative sliding movement of the main chassis and the subchassis, and the lid of the tape cassette and the opening member are disposed in overlying relationship to the rotary head cylinder while the tape is being wound around the rotary head cylinder.

The opening member is mounted on the subframe upstream of the holder in the directions in which the subframe is slidable.

The recording, reproducing, and recording/reproducing apparatus further comprises a frame with a lid member attached thereto, the frame being angularly movably mounted on the main chassis, and a link mechanism for vertically moving the holder in ganged relation to angular movement of the frame, the arrangement being such that the opening member is positioned below the frame while the tape is being wound around the rotary head cylinder.

In the recording, reproducing, and recording/reproducing apparatus according to the present invention, the tape cassette is loaded onto the subchassis, and the subchassis is slid with respect to the main chassis on which the rotary head cylinder is mounted, the tape stored in the tape cassette is drawn out and wound around the rotary head cylinder.

The tape holding member prevents the tape from riding onto the rotary head cylinder.

The tape rewinding mechanism which operates upon sliding movement of the subchassis allows the tape to be reliably rewound and stored in the tape cassette when the tape is unloaded.

With the guide rollers movable upon sliding movement of the subchassis, the number of constituent parts is reduced.

The hub drive shafts are braked while the subchassis is being slid, and are released when the movement of the subchassis is completed. Therefore, the tape can be loaded and unloaded without being slackened.

In the recording, reproducing, and recording/reproducing apparatus according to the present invention, the tape cassette is inserted into the cassette holder, and the cassette holder is lowered to load the tape cassette onto the subchassis. The subchassis is slid with respect to the main chassis on which the rotary head cylinder is mounted for drawing the tape stored in the tape cassette and winding the tape around the rotary head cylinder.

The tape cassette is prevented from being mounted and dismounted while the subchassis is being slid.

The subchassis is reliably locked with respect to the main chassis for stably positioning and holding the tape cassette.

When the tape cassette is slid toward the rotary head cylinder, the opened lid thereof and the opening member therefor are disposed in overlying relationship to the rotary head cylinder. The tape cassette is now positioned closely to the rotary head cylinder, i.e., the rotary head cylinder enters the tape cassette. The depth of the entire apparatus is therefore reduced.

BEST MODE FOR CARRYING OUT THE INVENTION

The present invention as it is applied to a portable tape player will be described below with reference to the drawings.

Figure 1:
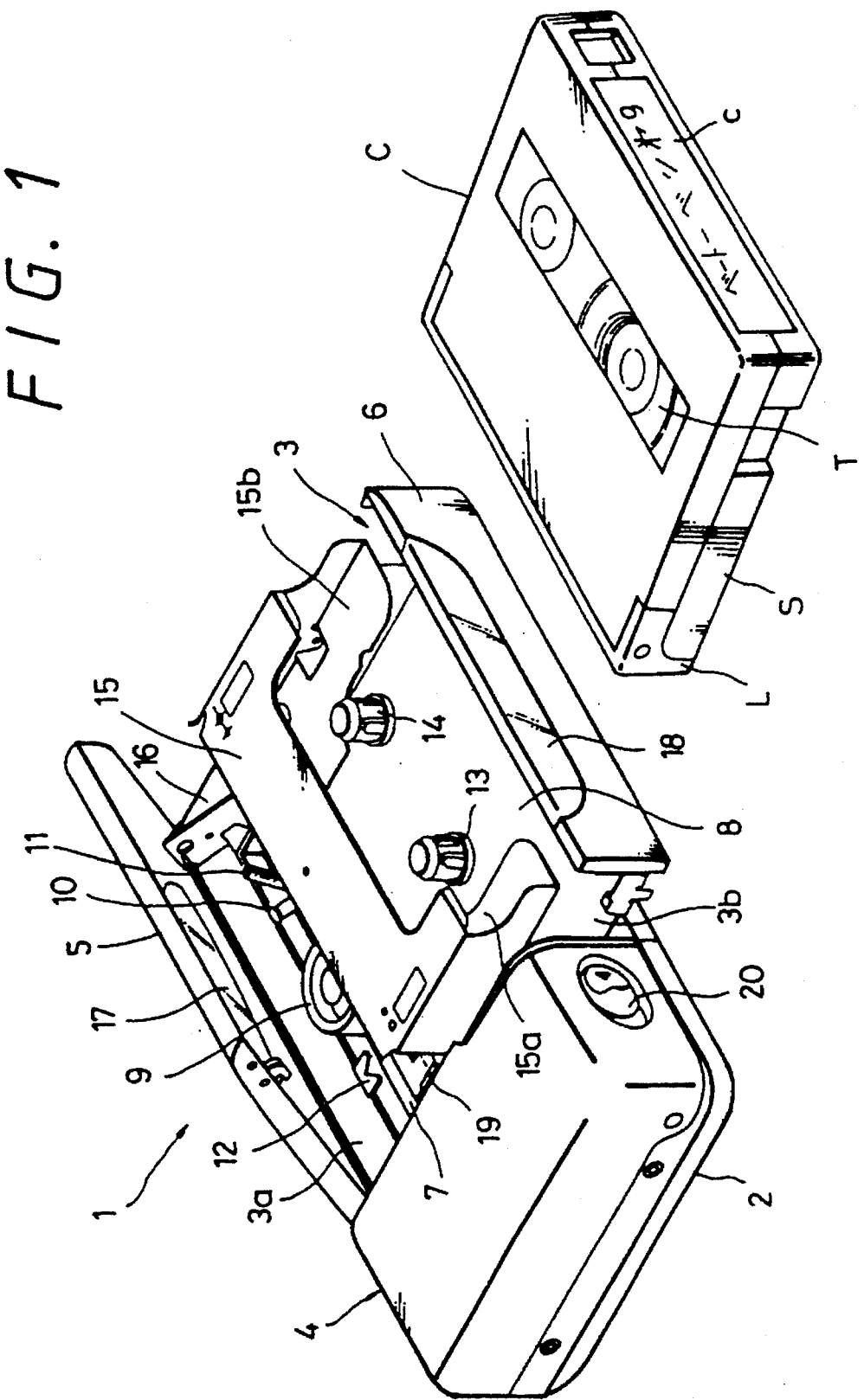
FIG. 1 is a perspective view of a cassette tape player according to the present invention, the cassette tape player being shown as open.

In FIG. 1, a portable tape player, generally denoted at 1, has an outer housing 2, a tape cassette storage casing (hereinafter referred to as a "storage casing") 3, and a battery storage section 4 disposed adjacent to the storage casing 3.

The storage casing 3 is open from an upper side 3a to a front side 3b thereof, the upper side 3a being closed by a lid 5 and the front side 3b by a front panel 6.

Figure 2:
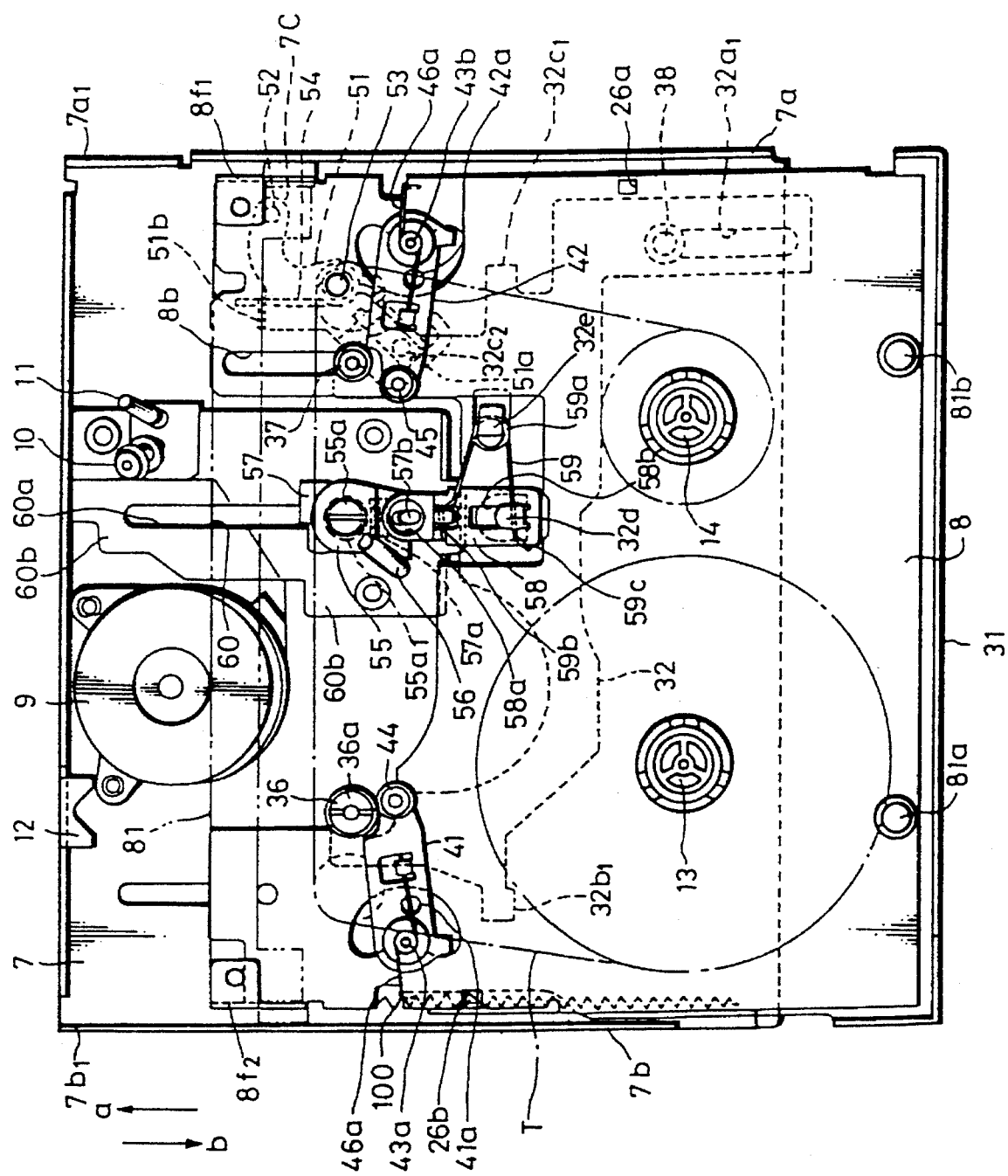
FIG. 2 is a plan view of an internal mechanism of the cassette tape player which is in a tape unloading condition.
Figure 3:
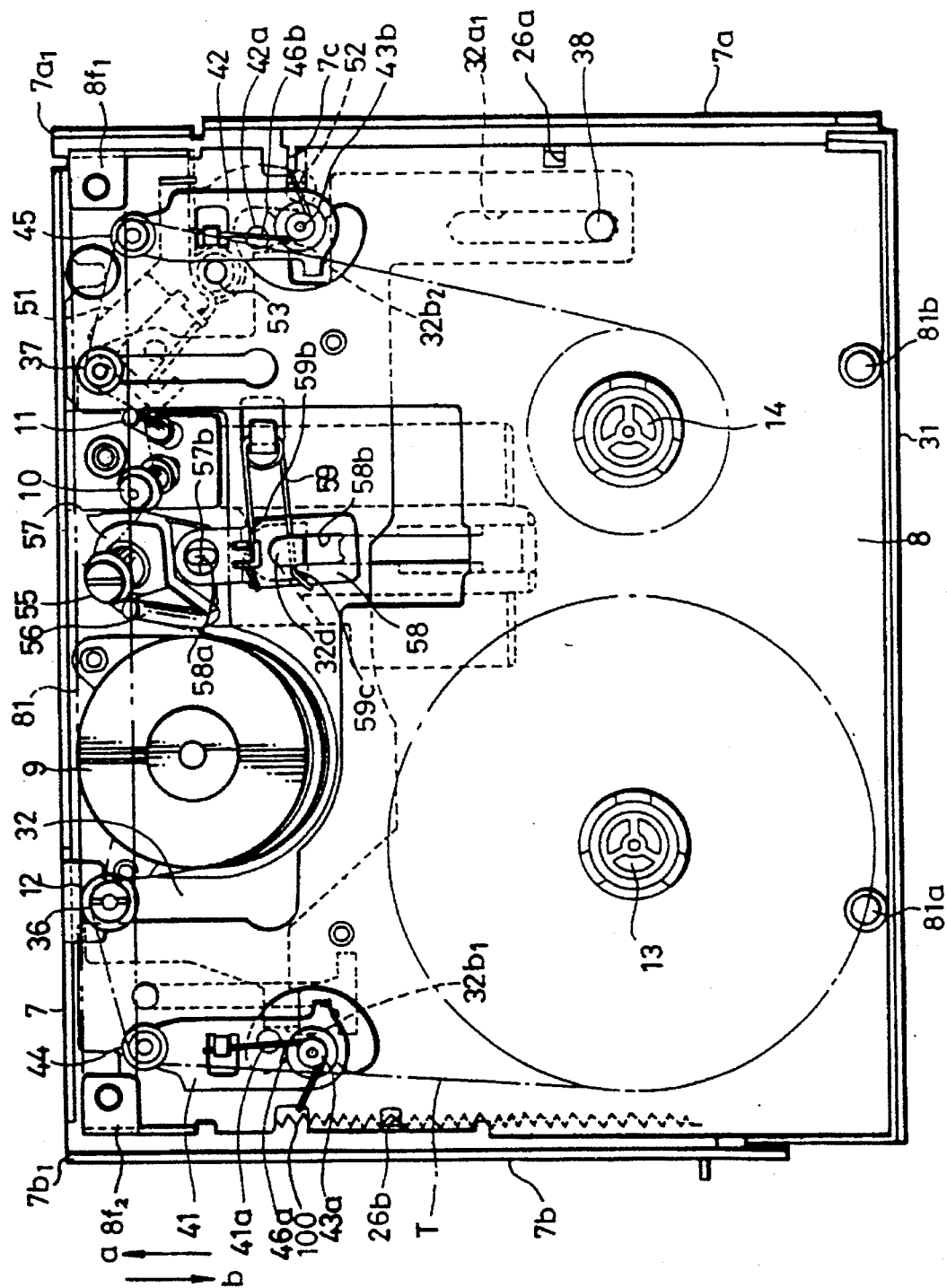
FIG. 3 is a plan view of the internal mechanism of the cassette tape player which is in a tape loading condition.
Figure 4:
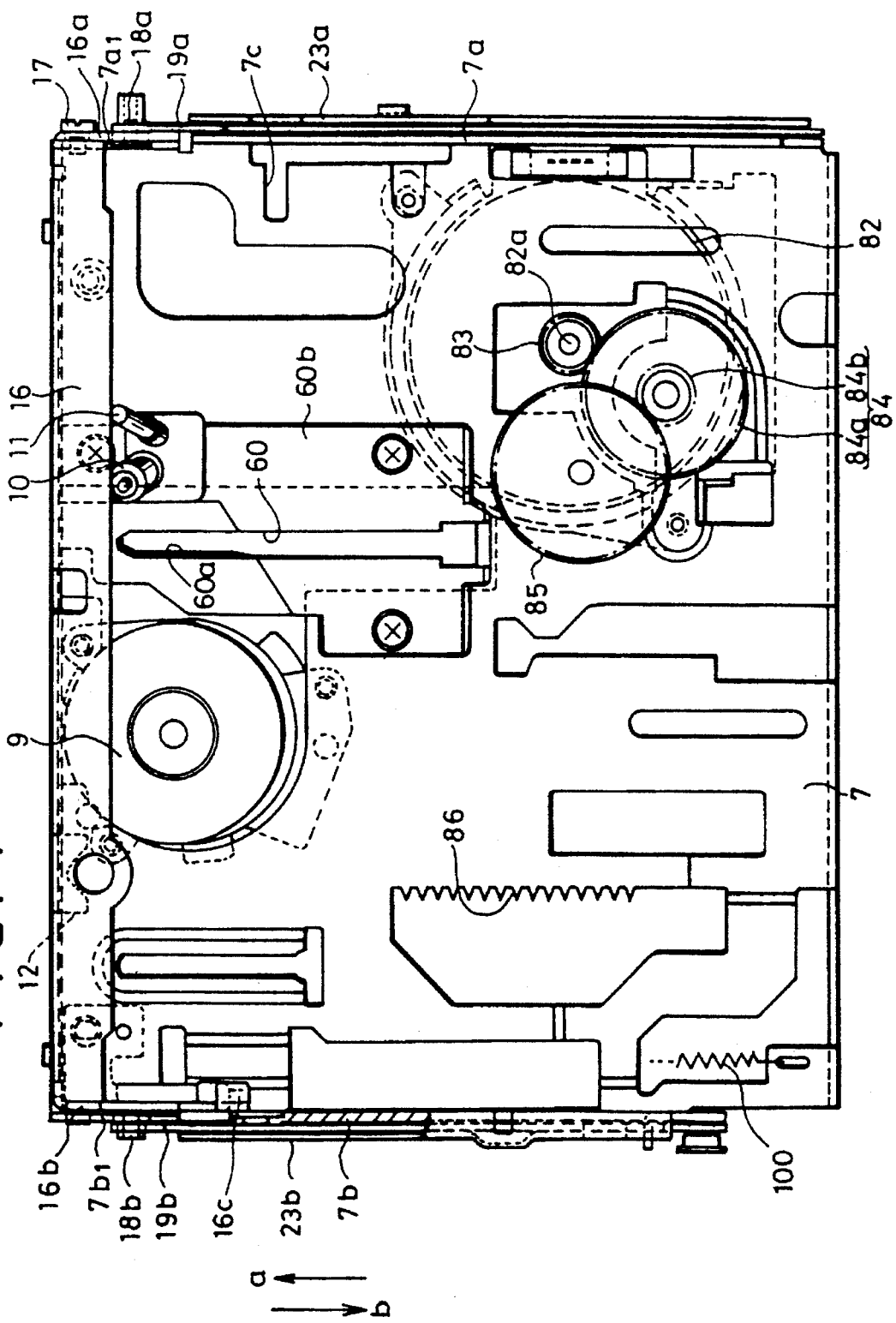
FIG. 4 is a plan view of a main chassis of the cassette tape player.

A main chassis 7 is fixed to the bottom of the storage casing 3. As shown in FIGS. 2 and 3, a subchassis 8 is mounted on the main chassis 7 for sliding movement in forward and backward directions indicated respectively by the arrows "a", "b" in FIGS. 2 and 3 As shown in FIGS. 2–4, a rotary head cylinder 9 is mounted substantially centrally on a front portion of the main chassis 7. An inclined roller guide 10 and an inclined guide 11 are disposed at a certain spacing in an outlet region of the rotary head cylinder 9, and a substantially V-shaped stopper 12 for positioning a movable inlet guide roller (described later on) is integrally formed with the main chassis 7 in the vicinity of an inlet region of the rotary head cylinder 9.

As shown in FIGS. 2, 3, and 4, the subchassis 8 has a supply hub drive shaft 13 and a takeup hub drive shaft 14. A group of movable guide rollers for defining a tape path on the side of the rotary head cylinder 9 are disposed on an inner end of the subchassis 8 directly or through rotatable or slidable members.

Figure 6:
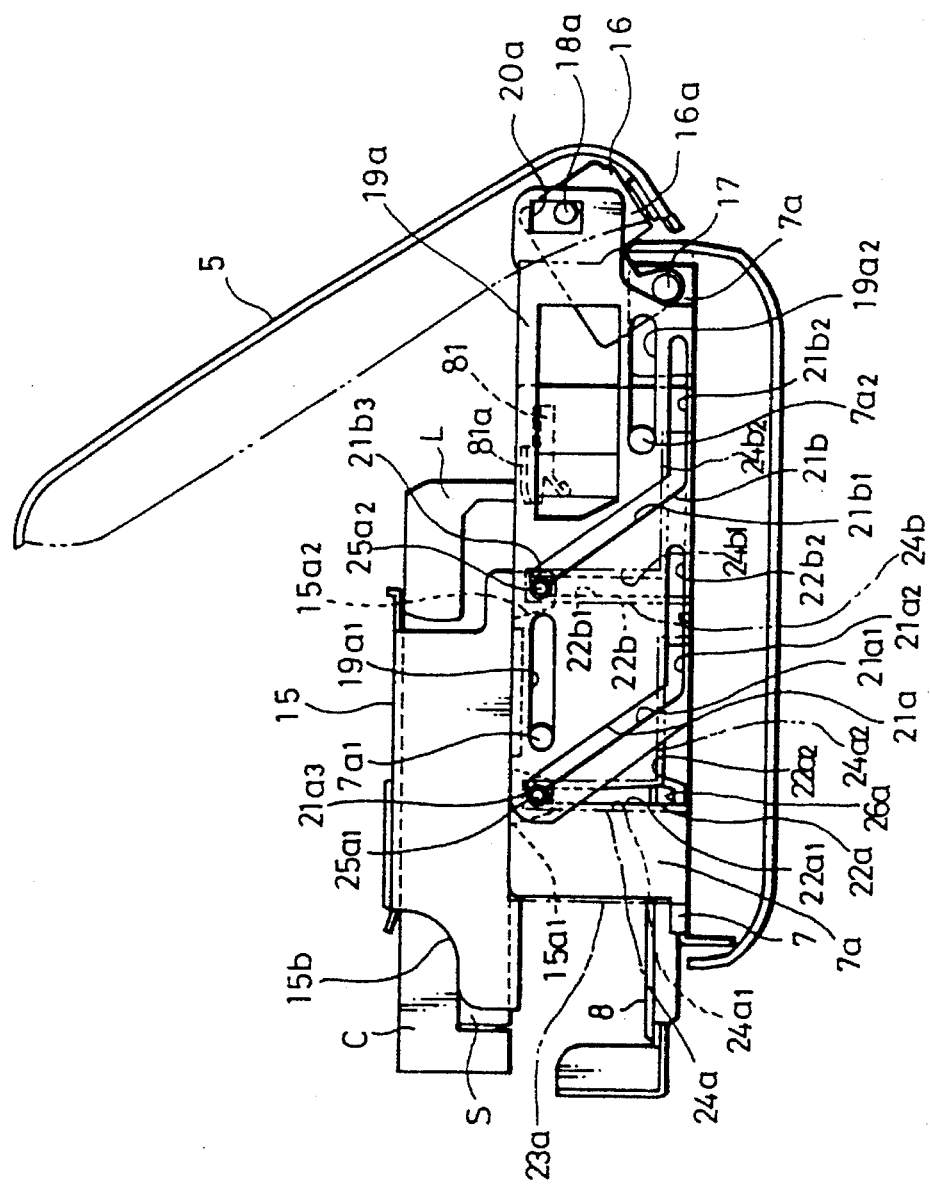
FIG. 6 is a side elevational view of the cassette tape player which is shown as being open.

The main chassis 7 and the subchassis 8 are coupled to each other for relative sliding movement in the forward and backward directions "a", "b". The subchassis 8 is normally urged to move in the backward direction "b" with respect to the main chassis 7 by a return spring 100 that engages between the main chassis 7 and the subchassis 8. As shown in FIG. 6, a cassette holder 15 is disposed in association with the main chassis 7 and the subchassis 8. The cassette holder 15 has a pair of cassette insertion arms 15a, 15b of channel-shaped cross section which are positioned respectively on opposite sides thereof, and is held in engagement with the main chassis 7 for movement in vertical directions and the forward and backward directions. The cassette holder 15 engages the subchassis 8 when lowered.

Figure 7:
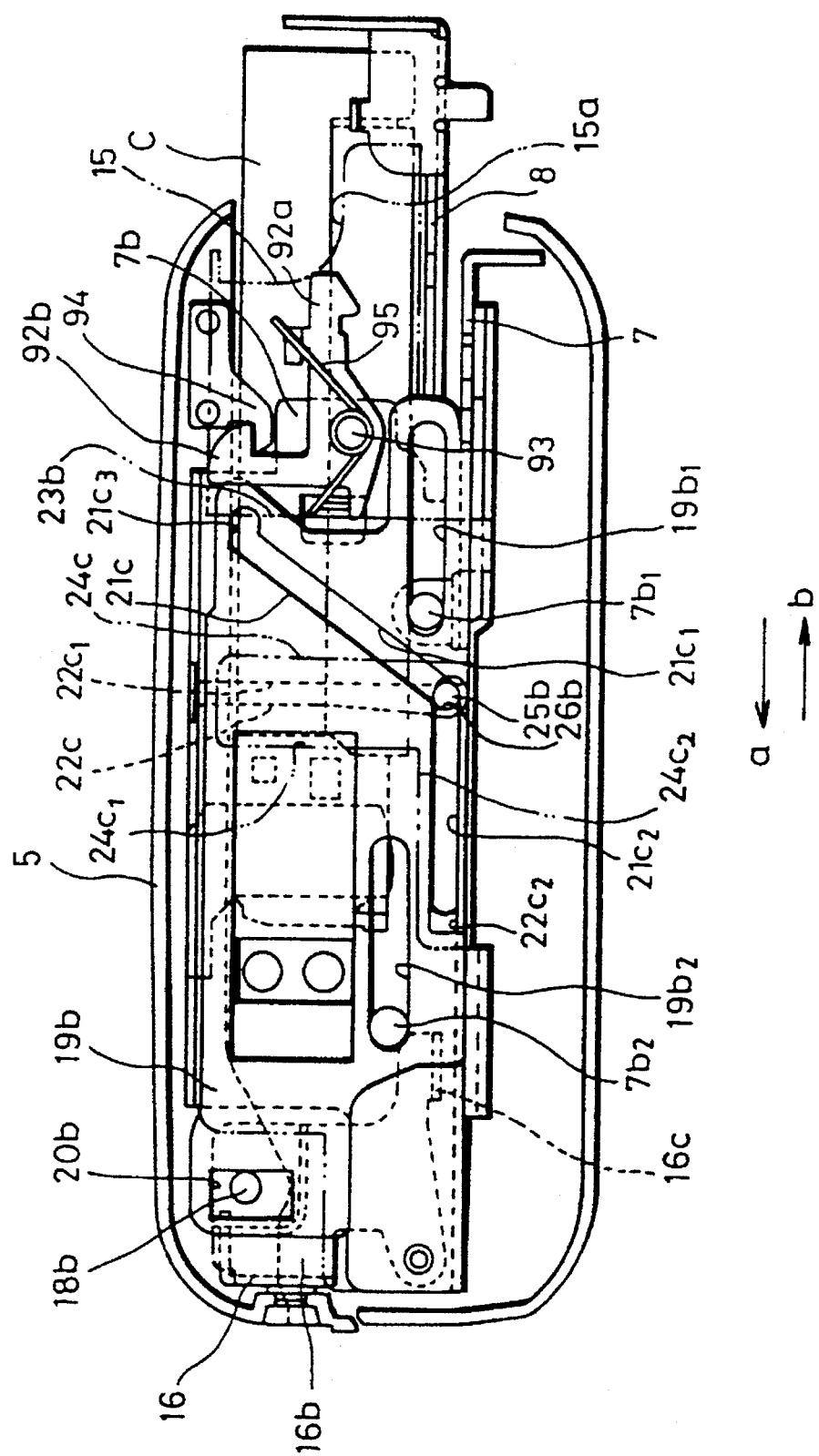
FIG. 7 is a side elevational view of the cassette tape player with a lid closed.

As shown in FIG. 4, the main chassis 7 has support plates 7a, 7b which rise vertically from opposite sides thereof, and an attachment frame 16 of the lid 5 is attached by stepped screws 17 between front ends $7a_1$, $7b_1$ of the respective support plates 7a, 7b for rotation in the forward and backward directions "a", "b". Shaft pins 18a, 18b are fixed by staking to respective opposite sides 16a, 16b of the attachment frame 16. As shown in FIGS. 6 and 7, the shaft pins 18a, 18b engage respectively in vertically elongate holes 20a, 20b which are defined in respective front ends of cam plates 19a, 19b that are slidable along the support plates 7a, 7b in the forward and backward directions. With the shaft pins 18a, 18b thus engaging respectively in the vertically elongate holes 20a, 20b, the attachment frame 16 and the cam plates 19a, 19b are coupled to each other, thereby making up a link mechanism. The cam plates 19a, 19b have respective pairs of horizontal guide slots $19a_1$, $19a_2$ and $19b_1$, $19b_2$ defined therein which receive respective guide pins $7a_1$, $7a_2$ and $7b_1$, $7b_2$ projecting on the support plates 7a, 7b.

One (right-hand one) of the cam plates 19a has a pair of cam holes 21a, 21b defined respectively in front and rear portions thereof, and the other (left-hand one) of the cam plates 19b has a single cam hole 21c defined therein. The cam holes 21a, 21b, 21c are composed of respective oblique oblong holes $21a_1$, $21b_1$, $21c_1$ inclined downwardly in the forward direction "a" in FIGS. 6 and 7, respective horizontal oblong holes $21a_2$, $21b_2$, $21c_2$ extending forward from the lower ends of the oblique oblong holes, and respective horizontal engaging holes $21a_3$, $21b_3$, $21c_3$ extending in the backward direction "b" in FIGS. 6 and 7 from the upper ends of the oblique oblong holes.

The support plates 7a, 7b of the main chassis 7, by which the cam plates 19a, 19b are slidably guided, have L-shaped guide holes 22a, 22b, 22c defined therein. The guide holes 22a, 22b, 22c have respective vertical oblong holes $22a_1$, $22b_1$, $22c_1$ whose lengths are substantially equal to the vertical distances between the horizontal oblong holes $21a_2$, $21b_2$, $21c_2$ and the horizontal engaging holes $21a_3$, $21b_3$, $21c_3$, and respective horizontal oblong holes $22a_2$, $22b_2$, $22c_2$ whose lengths are substantially equal to the lengths of the respective horizontal oblong holes $21a_2$, $21b_2$, $21c_2$.

Figure 5:
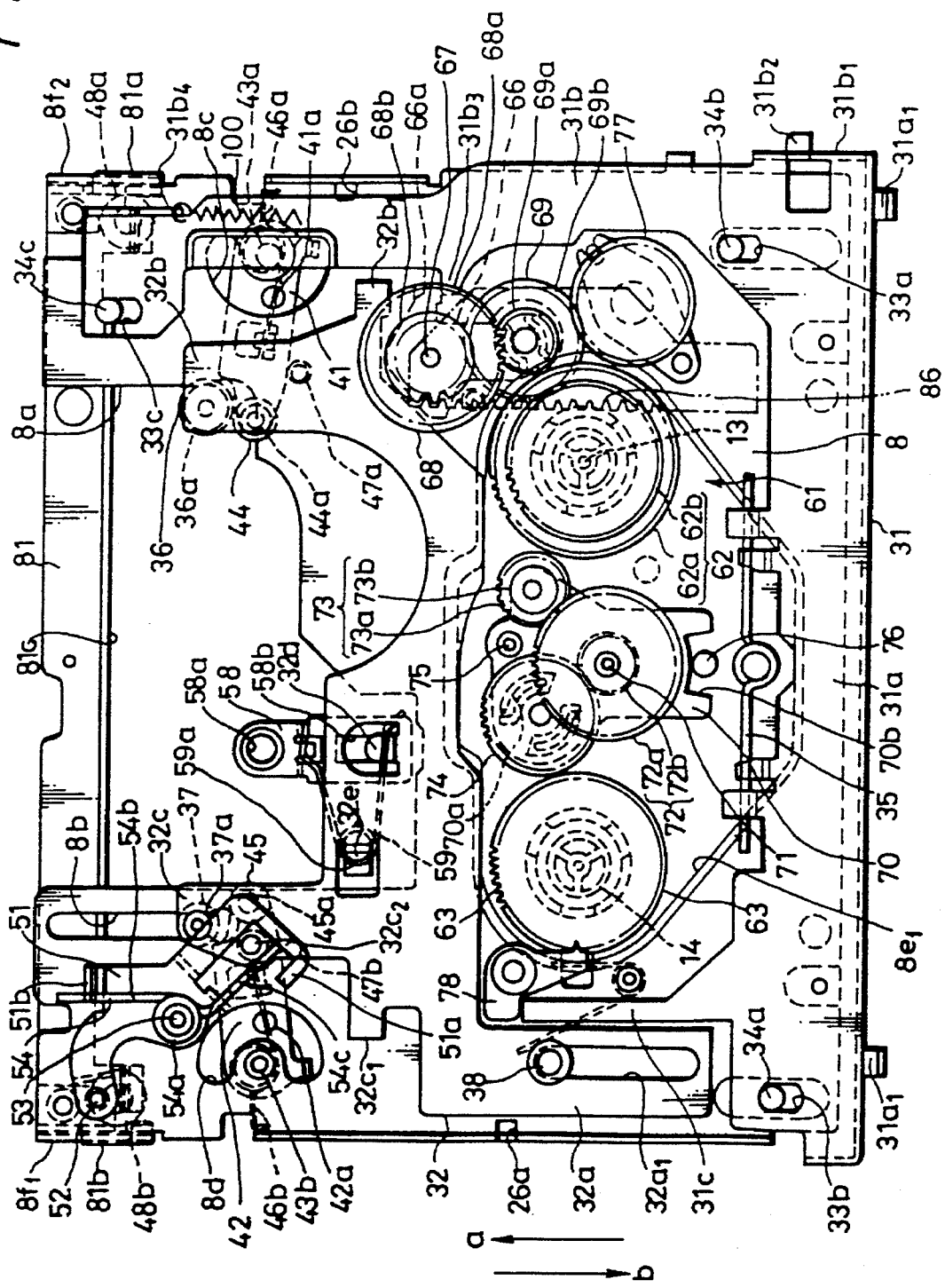
FIG. 5 is a plan view of the reverse side of a subchassis of the cassette tape player.

As shown in FIGS. 5–7, support plates 23a, 23b are mounted on the outer sides of the support plates 7a, 7b, respectively, with the cam plates 19a, 19b sandwiched therebetween, thereby holding the cam plates 19a, 19b. The support plates 23a, 23b have L-shaped guide holes 24a, 24b, 24c defined therein which are substantially identical in shape to the guide holes 22a, 22b, 22c of the support plates 7a, 7b. The guide holes 24a, 24b, 24c are composed of respective vertical oblong holes $24a_1$, $24b_1$, $24c_1$ and respective horizontal oblong holes $24a_2$, $24b_2$, $24c_2$.

The cassette holder 15, i.e., the cassette insertion arms 15a, 15b, have lobes $15a_1$, $15a_2$, 15b projecting downwardly from the lower edges of outer sides thereof, and shaft pins $25a_1$, $25a_2$, 25b project outwardly from the respective lobes $15a_1$, $15a_2$, 15b in alignment with the respective vertical oblong holes $22a_1$, $22b_1$, $22c_1$ of the guide holes 22a, 22b, 22c of the main chassis 7. The cassette holder 15 is supported on the main chassis 7 by the shaft pins $25a_1$, $25a_2$, 25b which are inserted through the guide holes 22a, 22b, 22c and the cam holes 21a, 21b, 21c into guide holes 24a, 24b, 24c of the support plates 23a, 23b.

The shaft pin $25a_1$ on one side (right-hand side) and the shaft pin 25b on the other side (left-hand side) project inwardly from the lobes $15a_1$, 15b, respectively.

When the attachment frame 16 of the lid 5 is rotated, the cassette holder 15 supported on the main frame 7 is lifted and lowered with respect to the main frame 7. More specifically, when the lid 15 is opened, the attachment frame 16 is rotated moving the cam plates 19a, 19b slidingly in the forward direction "a" (FIGS. 6 and 7). The edges of the oblique oblong holes $21a_1$, $21b_1$, $21c_1$ of the cam holes 21a, 21b, 21c slide against the shaft pins $25a_1$, $25a_2$, 25b in a direction to raise the points of contact therewith, thereby lifting the shaft pins $25a_1$, $25a_2$, 25b along the vertical oblong holes $22a_1$, $22b_1$, $22c_1$ of the guide holes 22a, 22b, 22c and the vertical oblong holes $24a_1$, $24b_1$, $24c_1$ of the guide holes 24a, 24b, 24c, so that the cassette holder 15 is elevated. When the lid 5 is fully opened, the cam plates 19a, 19b are slid to the front end of their stroke, with the engaging holes $21a_3$, $21b_3$, $21c_3$ fitting respectively over the shaft pins $25a_1$, $25a_2$, 25b. The cassette holder 15 is now held in an uppermost position, i.e., a position above the upper edges of the support plates 7a, 7b of the main chassis 7 (see FIG. 6).

When the lid 5 is closed from the fully opened condition, the attachment frame 16 is rotated back moving the cam plates 19a, 19b slidingly in the backward direction "b" (FIGS. 6 and 7). The edges of the oblique oblong holes $21a_1$, $21b_1$, $21c_1$ of the cam holes 21a, 21b, 21c slide against the shaft pins $25a_1$, $25a_2$, 25b in a direction to lower the points of contact therewith, thereby lowering the shaft pins $25a_1$, $25a_2$, 25b, so that the cassette holder 15 descends. When the lid 5 is fully closed, the cam plates 19a, 19b are slid to the rear end of their stroke. The cassette holder 15 is now placed on the subchassis 8 on the main chassis 8, and the inner ends of the shaft pins $25a_1$, 25b which project inwardly from the inner surfaces of the lobes $15a_1$, 15b engage respectively in recesses 26a, 26b that are defined in the subchassis 8 (see FIGS. 6 and 7).

The subchassis 8 is then pushed to slide in the forward direction "a" in FIG. 7 with respect to the main chassis 7 against the bias of the return spring 100 that engages between the main chassis 7 and the subchassis 8. The sliding movement of the subchassis 8 causes the cassette holder 15 to slide with the subchassis 8 on account of the shaft pins $25a_1$, 25b engaging in the recesses 26a, 26b. At this time, the shaft pins $25a_1$, $25a_2$, 25b of the cassette holder 15 move along the horizontal oblong holes $22a_2$, $22b_2$, $22c_2$ of the guide holes 22a, 22b, 22c, the horizontal oblong holes $24a_2$, $24b_2$, $24c_2$ of the guide holes 24a, 24b, 24c, and the horizontal oblong holes $21a_2$, $21b_2$, $21c_2$ of the cam holes 21a, 21b, 21c, and hence do not obstruct the sliding movement of the cassette holder 15. When the subchassis 8 is thus pushed to slide, the front panel 6 fixed to the front end of the subchassis 8 closes the front open side 3b of the storage casing 3 (see FIG. 8).

The structure of a movable chassis block, i.e., the subchassis 8, will be described below with reference to FIG. 5.

A first slide plate 31 which is substantially L-shaped and a second slide plate 32 which is substantially channel-shaped are mounted on the reverse side of the subchassis 8 for sliding movement in the forward and backward directions.

More specifically, the first slide plate 31 has engaging holes 33a, 33b defined in respective opposite ends of a horizontal portion 31a thereof and an engaging hole 33c defined in a front end of a vertical portion 31b thereof, the engaging holes 33a, 33b, 33c being elongate in the forward and backward directions "a", "b". The first slide plate 31 is attached to the subchassis 8 by support pins 34a, 34b, 34c which project on the subchassis 8 and engage in the engaging holes 33a, 33b, 33c, respectively. The horizontal portion 31a of the first slide plate 31 has attachment teeth $31a_1$ for the front panel 6 which are bent toward the face side of the subchassis 8 from the rear edge of the horizontal portion 31a. The vertical portion 31b of the first slide plate 31 has a raised member $31b_1$ on an outer edge of a rear end thereof, an engaging tooth $31b_2$ projecting from an upper edge of the raised member $31b_1$, an actuating tooth $31b_3$ projecting from an inner edge of a central portion thereof, and a spring retaining tooth $31b_4$ lowered from an outer edge of a front end thereof. The first slide plate 31 is normally biased to move in the backward direction "b" by a torsion spring 35 which has a coiled portion engaged by the subchassis 8.

The second slide plate 32 has a guide slot $32a_1$ defined in an arm 32a extending in the backward direction "b", the guide slot $32a_1$ being elongate in the forward and backward directions "a", "b". The second slide plate 32 includes front end portions 32b, 32c positioned on opposite sides thereof, and inlet and outlet guide rollers 36, 37 are supported on the respective front ends of the front end portions 32b, 32c by respective attachment shafts 36a, 37b. The second slide plate 32 is disposed on a front half of the reverse side of the subchassis 8. A support pin 38 projecting on the subchassis 8 engages in the guide slot $32a_1$. The inlet guide roller 36 has an attachment shaft 36a engaging a straight guide edge 8a which is defined on a left-hand front end portion of the subchassis 8 and extends in the forward and backward directions, and the outlet guide roller 37 has an attachment shaft 37a engaging in a guide slot 8b defined in a right-hand front end portion of the subchassis 8 parallel to the guide edge 8a. Therefore, the second slide plate 32 is mounted on the subchassis 8 for sliding movement in the forward and backward directions. The second slide plate 32 has pressers $32b_1$, $32c_1$ projecting horizontally from respective outer edges of the front end portions 32b, 32c thereof.

A pair of left and right rocking levers 41, 42 is rotatably mounted by respective shaft pins 43a, 43b on opposite sides of the face side of a front end of the subchassis 8. Rocking guide rollers 44, 45 are supported on the rocking levers 41, 42, respectively, by shafts 44a, 45a which are mounted on respective free ends of the rocking levers 41, 42.

Tubular projections 41a, 42a are formed by burring on the reverse side of the rocking levers 41, 42 at their intermediate positions, respectively. The tubular projections 41a, 42a are inserted from the reverse side of the subchassis 8 into semicircular windows 8c, 8d that are defined in the subchassis 8 about the shaft pins 43a, 43b. The rocking levers 41, 42 are normally urged to return in the backward direction "b" by respective return springs 46a, 46b until the tubular projections 41a, 42a are engaged by the subchassis 8.

When the second slide plate 32 slides forward, the pressers $32b_1$, $32c_1$ thereof engage and press the tubular projections 41a, 42a, respectively, for thereby turning the rocking levers 41, 42 into a substantially vertical direction in which the rocking levers 41, 42 abut against and are engaged by engaging pins 48a, 48b, respectively, projecting on opposite sides of the front end of the subchassis 8. In this condition, side edges of the pressers $32b_1$, $32c_1$ are held against inner sides of the tubular projections 41a, 42a, respectively, holding the rocking levers 41, 42 in the vertical direction (see FIG. 3).

A displacement amplifying lever 51 for amplifying the displacement of the subchassis 8 relative to the main chassis 7 and transmitting the amplified displacement to the second slide plate 32 is mounted on the subchassis 8. The displacement amplifying lever 51 has a hook 51a on one end thereof and a guide pin 52 projecting on the other end thereof, and is rotatably supported at its intermediate portion on the reverse side of the subchassis 8 by a shaft pin 53. The guide pin 52 slidably engages in a lateral slit 7c defined in the main chassis 7 (see FIGS. 2 and 3), and the hook 51a engages a tubular projection $32c_2$ formed by burring on the front end portion 32c of the second slide plate 32.

A torsion coil spring 54 has a coil portion 54a mounted on the shaft pin 53 by which the displacement amplifying lever 51 is supported on the subchassis 8. The torsion coil spring 54 has an end portion 54b engaging an engaging portion 51b of the displacement amplifying lever 51 which is positioned opposite to the hook 51a across the shaft pin 53, and an opposite end portion 54c engaging the tubular projection $32c_2$ of the second slide plate 32. The torsion coil spring 54 thus normally urges the displacement amplifying lever 51 to turn counterclockwise in FIGS. 2 and 3, i.e., to cause the hook 51a to engage the tubular projection $32c_2$ and hence to cause the tubular projection $32c_2$ to move the second slide plate 32 backward.

As shown in FIGS. 2, 3, and 5, a guide base 57 having a guide roller 55 and a slanted guide 56 is coupled by a lever 58 to a front portion of the second slide plate 32 for sliding movement in the forward and backward directions. The guide base 57 is normally biased to move in the forward direction by a torsion spring 59.

More specifically, as shown in FIGS. 2 and 3, the guide base 57 slidably engages in a guide groove 60 (see also FIG. 4) which is defined in the main chassis 7 laterally of the outlet region of the rotary head cylinder 9 and extends linearly in the forward and backward directions "a", "b". The guide groove 60 includes a front portion 60a extending near the rotary head cylinder 9, and twisted toward the rotary head cylinder 9 and inclined downwardly. The guide base 57 has an engaging protrusion 57a projecting from a lower surface thereof, and the guide roller 55 has an attachment shaft 55a including a flanged shaft extension $55a_1$. The guide base 57 slidably engages in the guide groove 60 through the engaging protrusion 57a and the flanged shaft extension $55a_1$. The guide base 57 is positioned when the flanged shaft extension $55a_1$ abuts against the front end of the guide groove 60.

The guide base 57 and the lever 58 are connected to each other by an engaging shaft 57b projecting from an upper surface of a rear portion of the guide base 57 and bent angularly in the backward direction, the engaging shaft 57b being loosely fitted in a circular engaging hole 58a defined in a front end of the lever 58. The lever 58 has a guide slot 58b defined in a rear end thereof which is elongate in the forward and backward directions. The guide slot 58b is fitted over an engaging tongue 32d raised from a front portion of the second slide plate 32 for thereby allowing the lever 58 to slide in the forward and backward directions. The lever 58 is normally urged to move in the forward direction by the torsion spring 59. The torsion spring 59 has a coil portion 59a engaging an engaging member 32e raised from the second slide plate 32, an end 59b engaging the lever 58, and an opposite end 59c engaging the engaging tongue 32d.

The guide groove 60 defined in the main chassis 7 is also defined in a guide plate 60b made of resin which is fixed to the main chassis 7. A base on which the inclined roller guide 10 and the inclined guide 11 are mounted is also made of resin.

A transmitting mechanism 61 in the form of a gear train for transmitting drive forces to the hub drive shafts 13, 14 which are mounted on the subchassis 8 will be described below with reference to FIG. 5.

Figure 14:
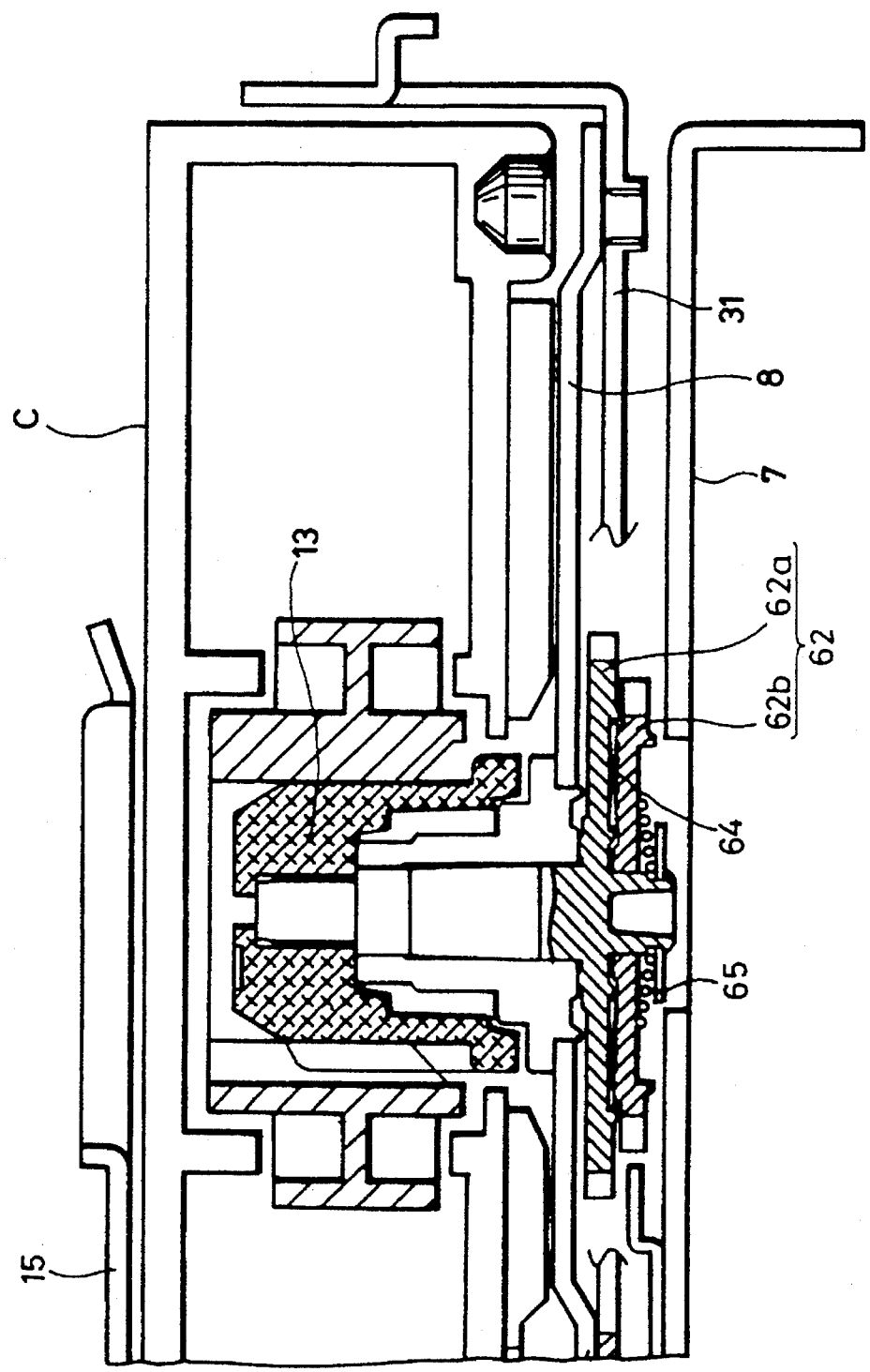
FIG. 14 is an enlarged cross-sectional view of a portion of the cassette tape player.

Drive gears 62, 63 are coupled respectively to the supply hub drive shaft 13 and the takeup hub drive shaft 14 on the reverse side of the subchassis 8. The drive gear 62 coupled to the supply hub drive shaft 13 comprises a larger-diameter gear 62a and a smaller-diameter gear 62b. As shown in FIG. 14, the larger-diameter gear 62a is fixed to the drive shaft 13, and the smaller-diameter gear 62b is rotatably supported on the drive shaft 13. A frictional member 64 which comprises a felt disk is interposed between the larger-diameter gear 62a and the smaller-diameter gear 62b. The smaller-diameter gear 62b is biased toward the larger-diameter gear 62a by a spiral spring 65 so as to be frictionally coupled to the larger-diameter gear 62a. The drive gear 63 is fixed to the takeup hub drive shaft 14.

Figure 13:
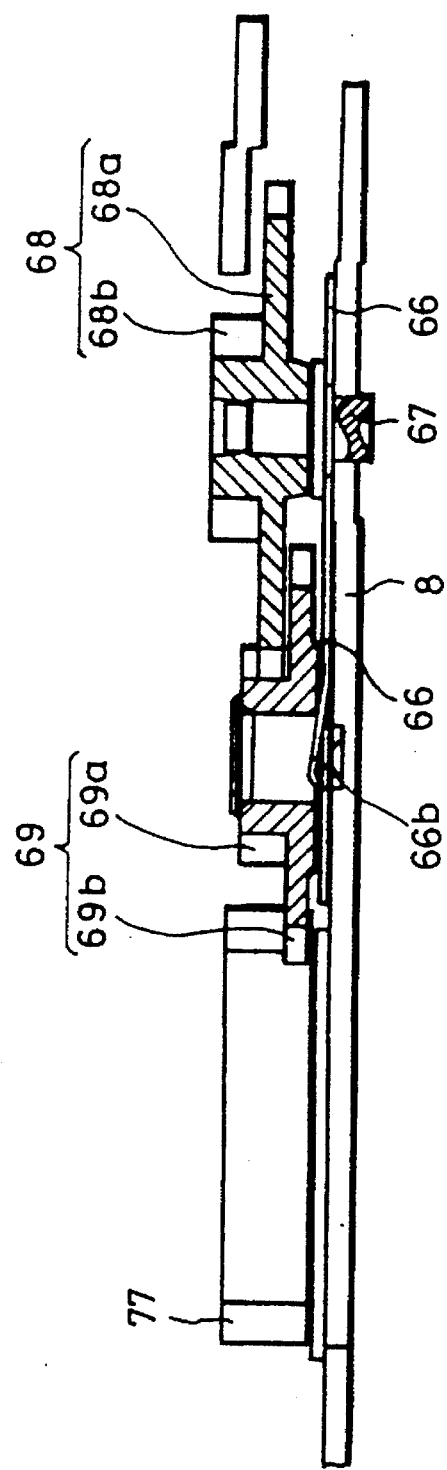
FIG. 13 is an enlarged cross-sectional view of a portion of the cassette tape player.

A tape rewinding mechanism for unloading a tape is positioned near the gear 62 coupled to the supply hub drive shaft 13. The tape rewinding mechanism has a swing lever 66 attached to the subchassis 8 by a shaft 67 (see FIG. 13) and having a projecting engaging member 66a for engaging the actuating tooth $31b_3$ of the vertical portion 31b of the first slide plate 31. As shown in FIG. 13, a first double gear 68 comprising a larger-diameter toothed portion 68a and a smaller-diameter toothed portion 68b is mounted on the shaft 67. A second double gear 69 is rotatably supported on a free end of the swing lever 66. The second double gear 69 comprises a smaller-diameter toothed portion 69a held in mesh with the larger-diameter toothed portion 68a of the first double gear 68, and a larger-diameter toothed portion 69b corresponding to the smaller-diameter gear 62b of the gear 62 that is coupled to the supply hub drive shaft 13. The swing lever 66 has a spring portion 66b for producing friction between the second double gear 69 and the swing lever 66.

A switching mechanism is positioned between the drive gears 62, 63 coupled respectively to the supply hub drive shaft 13 and the takeup hub drive shaft 14. The switching mechanism has a switching lever 70 rotatably mounted on the subchassis 8 by a shaft 71 for rotation in opposite directions. An intermediate gear 72 composed of a larger-diameter toothed portion 72a and a smaller-diameter toothed portion 72b is rotatably mounted on the shaft 71. A supply-hub transmission double gear 73 is supported on one side of one end of the switching lever 70, the supply-hub transmission double gear 73 comprising a larger-diameter toothed portion 73a meshing with the larger-diameter toothed portion 72a of the intermediate gear 72 and a smaller-diameter toothed portion 73b corresponding to the larger-diameter toothed portion 62 of the gear 62 coupled to the supply hub drive shaft 13. A takeup-hub transmission gear 74 is supported on an opposite side of the end of the switching lever 70 for producing friction with a spring portion 70a raised on the switching lever 70. The takeup-hub transmission gear 74 is held in mesh with the smaller-diameter toothed portion 72b of the intermediate gear 72 and corresponds to the gear 63 coupled to the takeup hub drive shaft 14. An actuating pin 75 projects substantially centrally on the end of the switching lever 70. The switching lever 70 has an angular movement limiting recess 70b defined in an opposite end thereof which receives an engaging pin 76 mounted on the reverse side of the subchassis 8.

A damper gear 77 is supported on the subchassis 8 in mesh with the larger-diameter toothed portion 69b of the second double gear 69. As shown in FIGS. 2, 15–17, a brake lever 78 having an engaging tooth 78a for engaging the drive gear 63 is angularly movably supported on the subchassis 8 near the takeup hub drive shaft 14, and normally biased to turn into engagement with the gear 63 by a torsion spring 79. When the first slide plate 31 slides forward, a presser 31c on the arm 31 thereof pushes an engaging portion 78b of the brake lever 78 remote from the engaging tooth 78a against the bias of the torsion spring 79 for thereby turning the engaging tooth 78a out of mesh with the drive gear 63.

Figure 8:
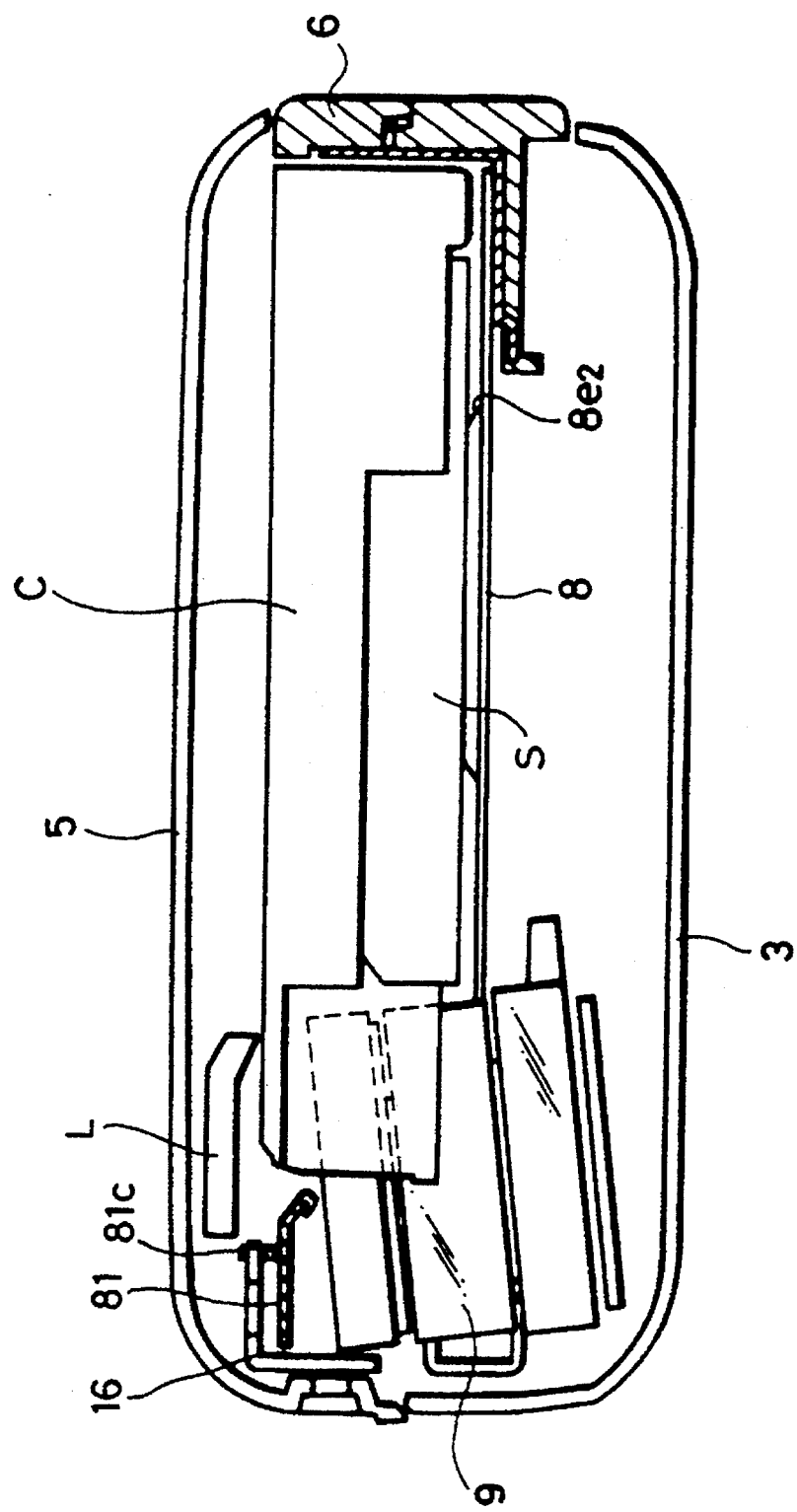
FIG. 8 is a sectional side elevational view of the cassette tape player which is in the tape loading condition.
Figure 9:
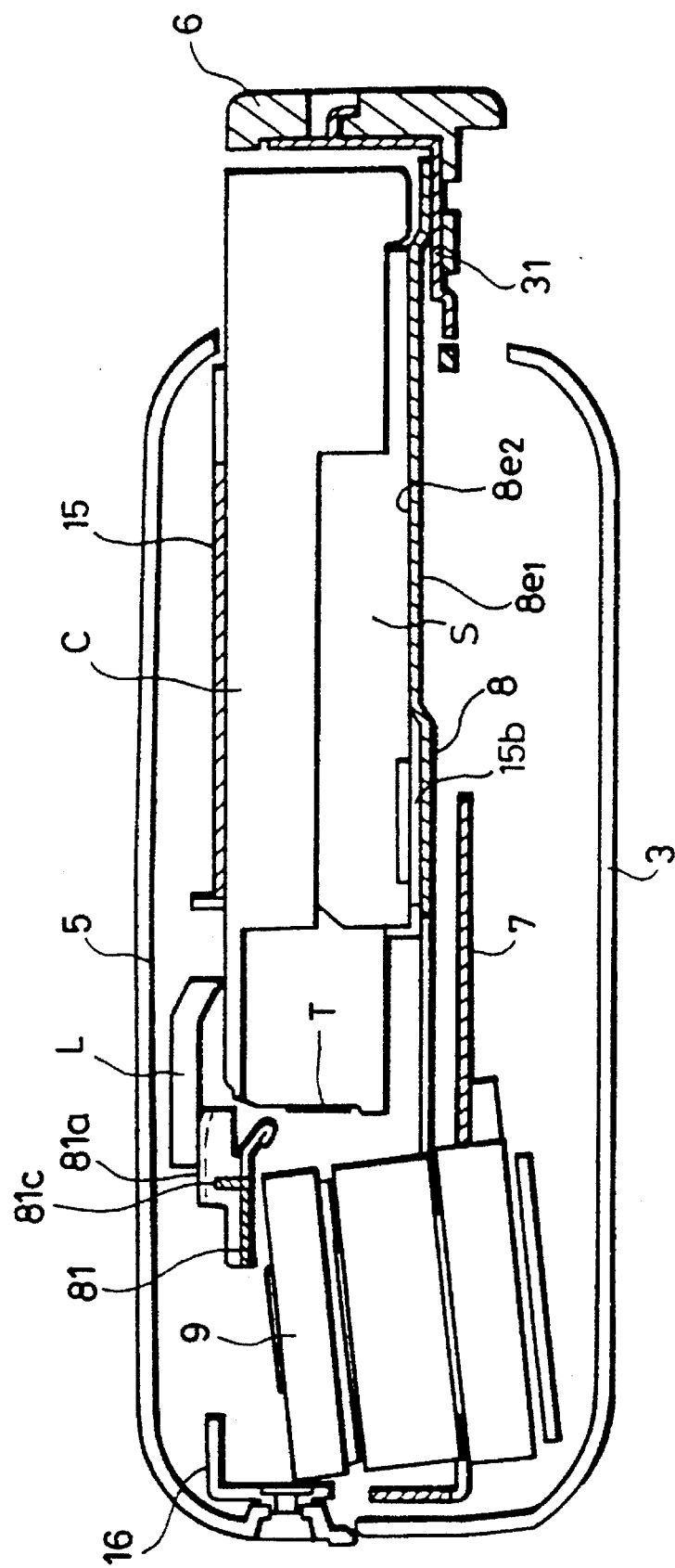
FIG. 9 is a sectional side elevational view of the cassette tape player which is in the tape unloading condition.
Figure 10:
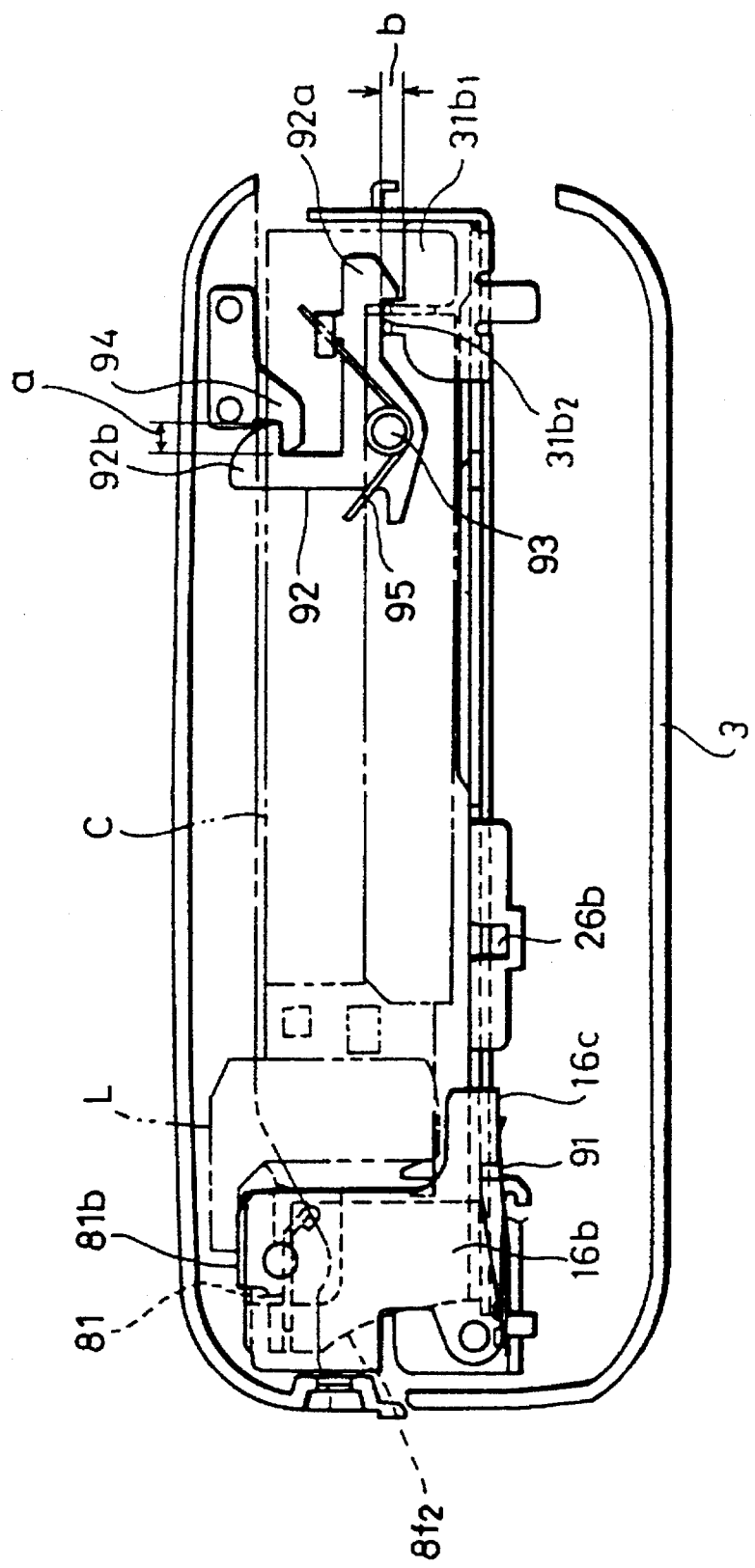
FIG. 10 is a side elevational view of a lock device of the cassette tape player which is in the tape loading condition.
Figure 11:
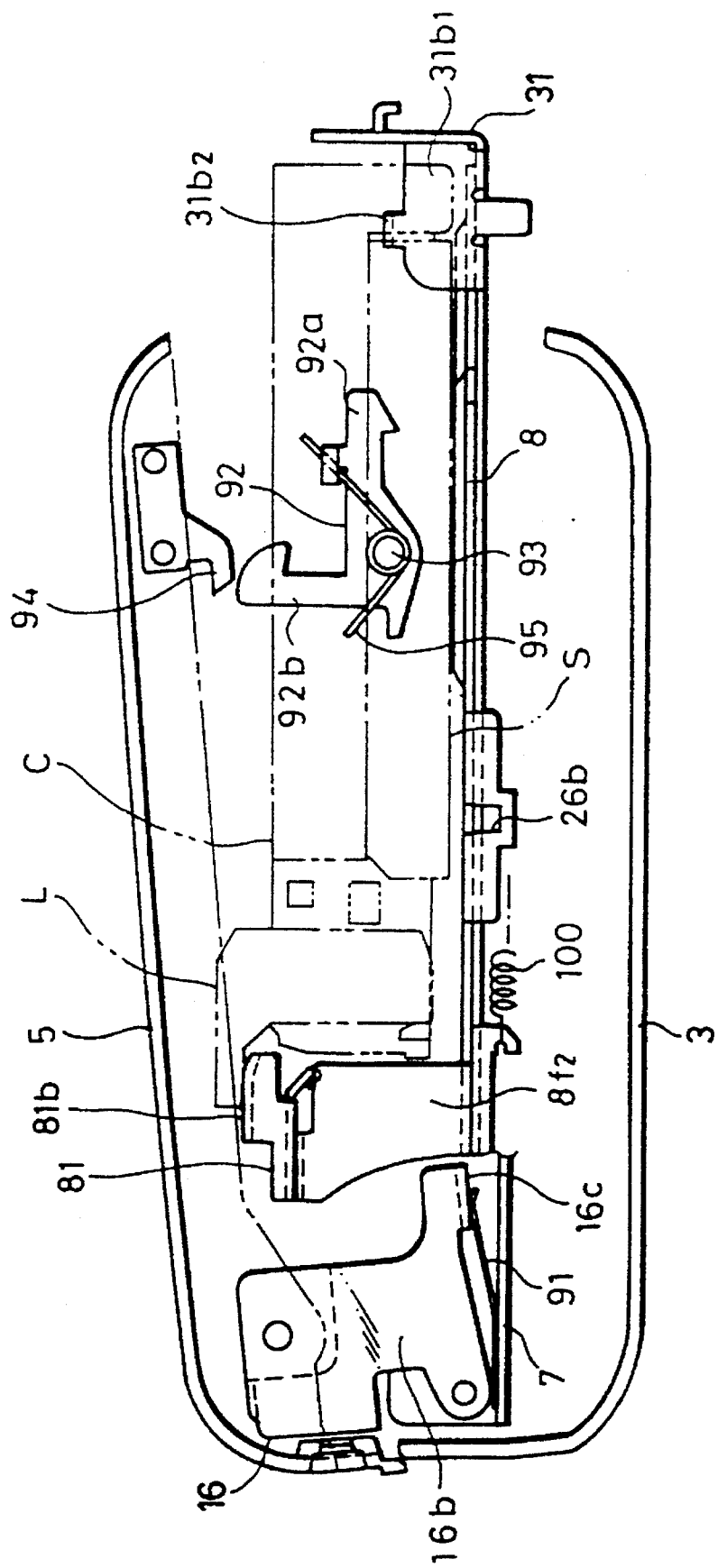
FIG. 11 is a side elevational view of the lock device of the cassette tape player which is in the tape unloading condition.
Figure 12:
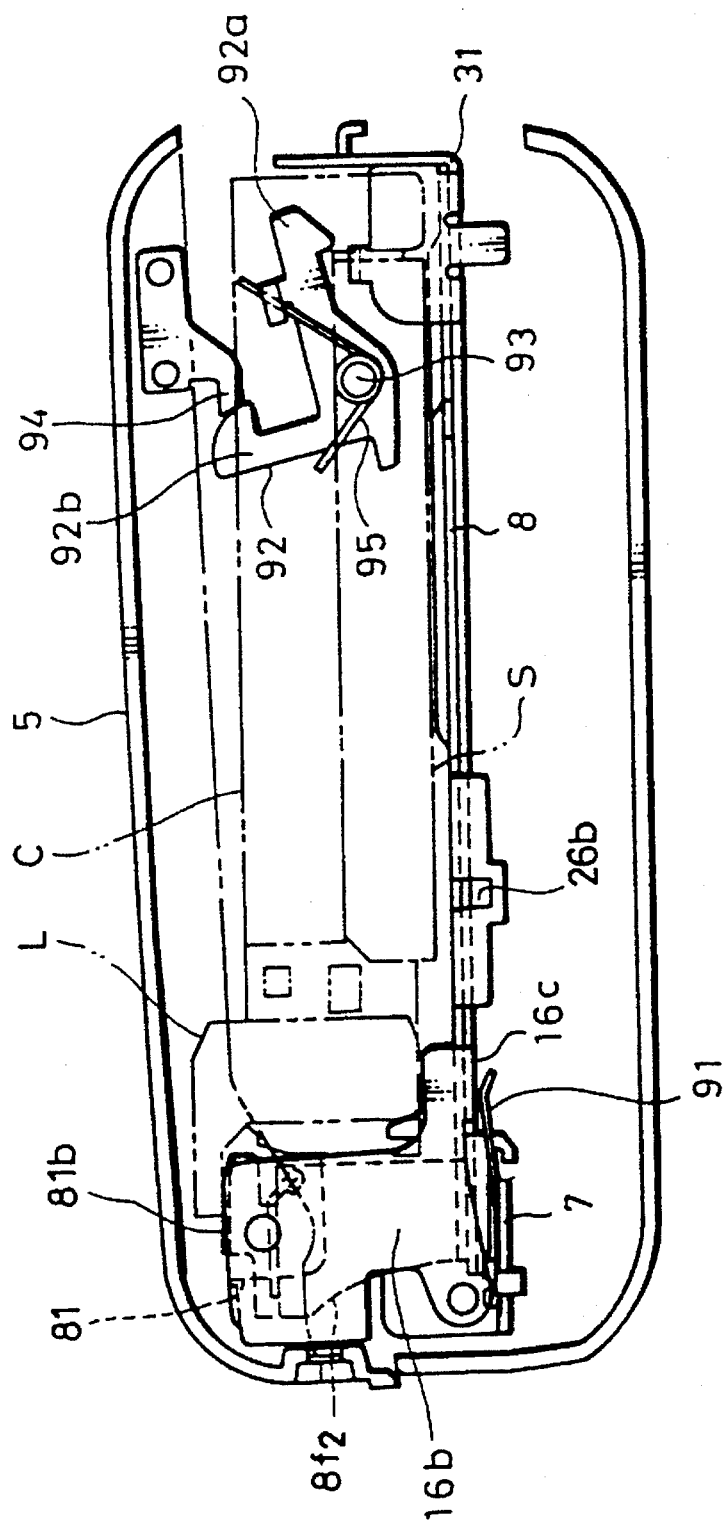
FIG. 12 is a side elevational view of the lock device which is shown as released.

The gears 62, 63 of the transmitting mechanism 61 and the intermediate gear 72 and the transmitting gears 73 of the switching mechanism are disposed in a recess $8e_1$ defined in the reverse side of the subchassis 8. As shown in FIGS. 8 and 9, the subchassis 8 has a land $8e_2$ formed on its face side opposite to the recess $8e_1$, the land $8e_2$ covering areas around the hub drive shafts 13, 14 and an area therebetween. The land $8e_2$ has a height substantially equal to the thickness of tongues 15c, 15d of the respective cassette insertion arms 15a, 15b, so that a tape cassette C can be placed on one surface provided by the land $8e_2$ and the tongues 15c, 15d.

As shown in FIGS. 2 and 3, a pair of left and right tape cassette positioning pins 80a, 80b projects from a rear portion of the face side of the subchassis 8.

The movable chassis block thus arranged has members for opening the front lid of a tape cassette and preventing a tape from riding on the head cylinder.

Specifically, as shown in FIGS. 5 and 8–12, lid openers 81a, 81b for being engaged by the lower edge of a front lid L of the tape cassette C are mounted on the subchassis 8 between raised members $8f_1$, $8f_2$ disposed on respective opposite sides of a front end of the subchassis 8. A lid opening/tape holding member 81 is laterally fixed to an intermediate portion of the front end of the subchassis 8 in confronting relationship to a front opening of the tape cassette C, the lid opening/tape holding member 81 having a tape holding surface portion 81c raised for preventing a tape T from being forced out.

The lid opening/tape holding member 81 is laterally fixed between the raised members $8f_1$, $8f_2$ disposed on the respective opposite sides of the front end of the subchassis 8. When the tape cassette C is inserted into the cassette holder 15 while the cassette holder 15 is being lifted in a rear position with respect to the main chassis 7, i.e., while the cassette holder 15 is being lifted with respect to the subchassis 8, the lower edge of the front lid L of the tape cassette C corresponds to the lid openers 81a, 81b.

Then, the lid 5 is closed, and the cassette holder 15 is lowered with respect to the subchassis 3. As shown in FIG. 9, the front lid L of the tape cassette C that descends with the cassette holder 15 is turned upwardly into a horizontal position by the lid openers 81a, 81b, thereby opening the front side of the tape cassette C. The front opening thus formed in the tape cassette C opens toward the tape holding surface portion 81c.

With the cassette holder 15 being lowered and the front lid L of the tape cassette C being opened, the subchassis 8 is pushed forward. As shown in FIG. 8, the lid opening/tape holding member 81 and the front lid L are positioned in overlying relationship to the rotary head cylinder 9, with substantially one-half of the circumference of the rotary head cylinder 9 being positioned in the tape cassette C. Now, the depth of the tape player as a whole is reduced.

As shown in FIG. 4, a hub drive motor 82 is mounted on the reverse side of the main chassis 7. The hub drive motor 82 has a motor shaft 82a to which there is fixed a drive gear 83 that is placed over the face side of the main chassis 7. A reverse double gear 84 composed of a larger-diameter toothed portion 84a and a smaller-diameter toothed portion 84b and a transmission gear 85 are mounted on the inner side of the main chassis 7. The larger-diameter toothed portion 84a of the reverse double gear 84 is held in mesh with the drive gear 83. The transmission gear 85 is held in mesh with the smaller-diameter toothed portion 84b and the larger-diameter toothed portion 72a of the intermediate gear 72 of the switching mechanism on the subchassis 8 shown in FIG. 5.

As shown in FIG. 4, a rack 86 extending in the forward and backward directions is mounted on a left-hand side of a rear portion of the main chassis 7. The rack 86 is held in mesh with the smaller-diameter toothed portion 68b of the first double gear 68 which is mounted on the shaft 67 coupled to the swing lever 66 on the subchassis 8, thus making up the tape rewinding mechanism associated with the supply hub drive shaft 13 for rewinding the tape in the tape unloading operation (see FIG. 5).

Figure 15:
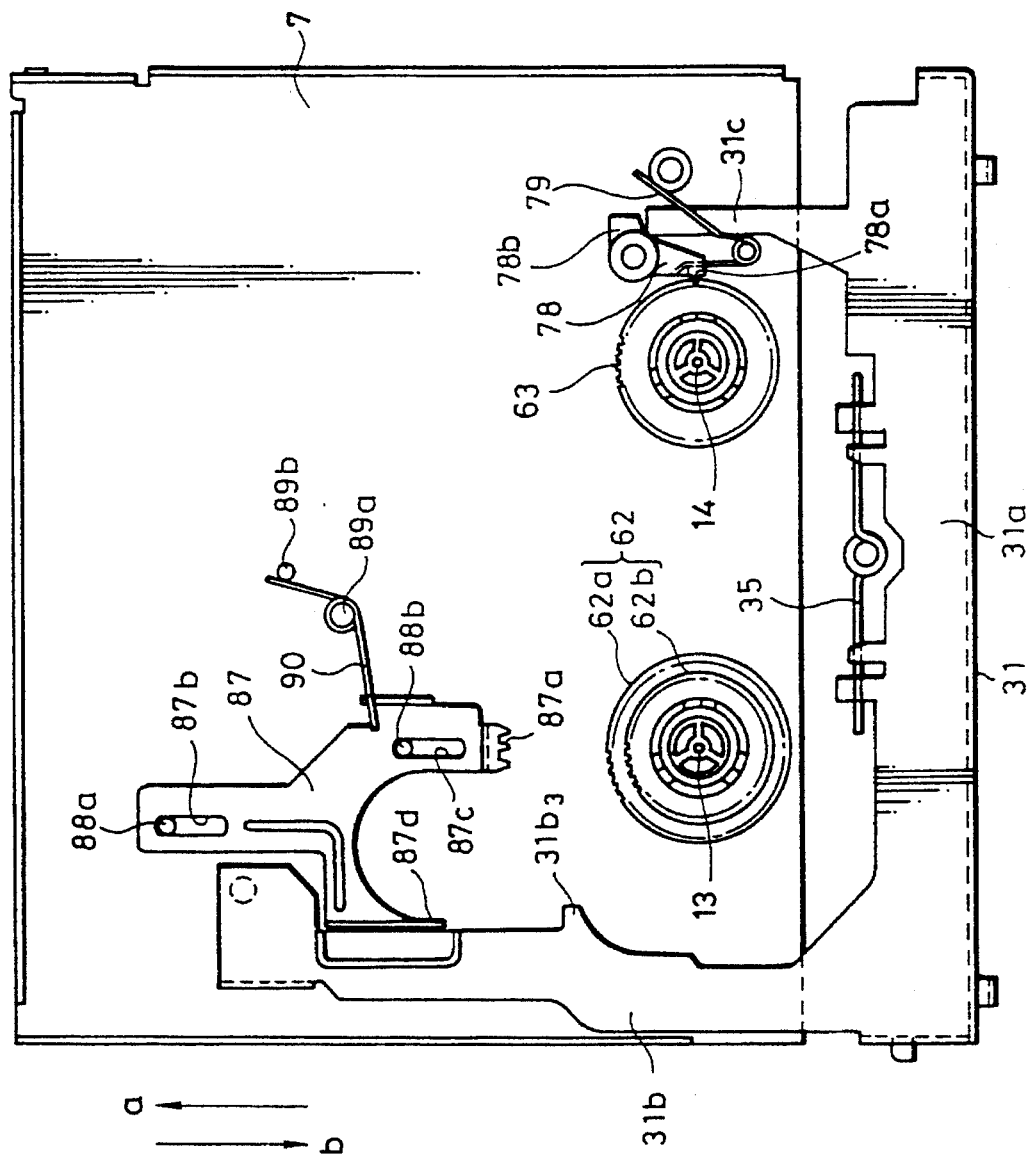
FIG. 15 is a plan view of the cassette tape player which is released in the tape unloading condition.
Figure 16:
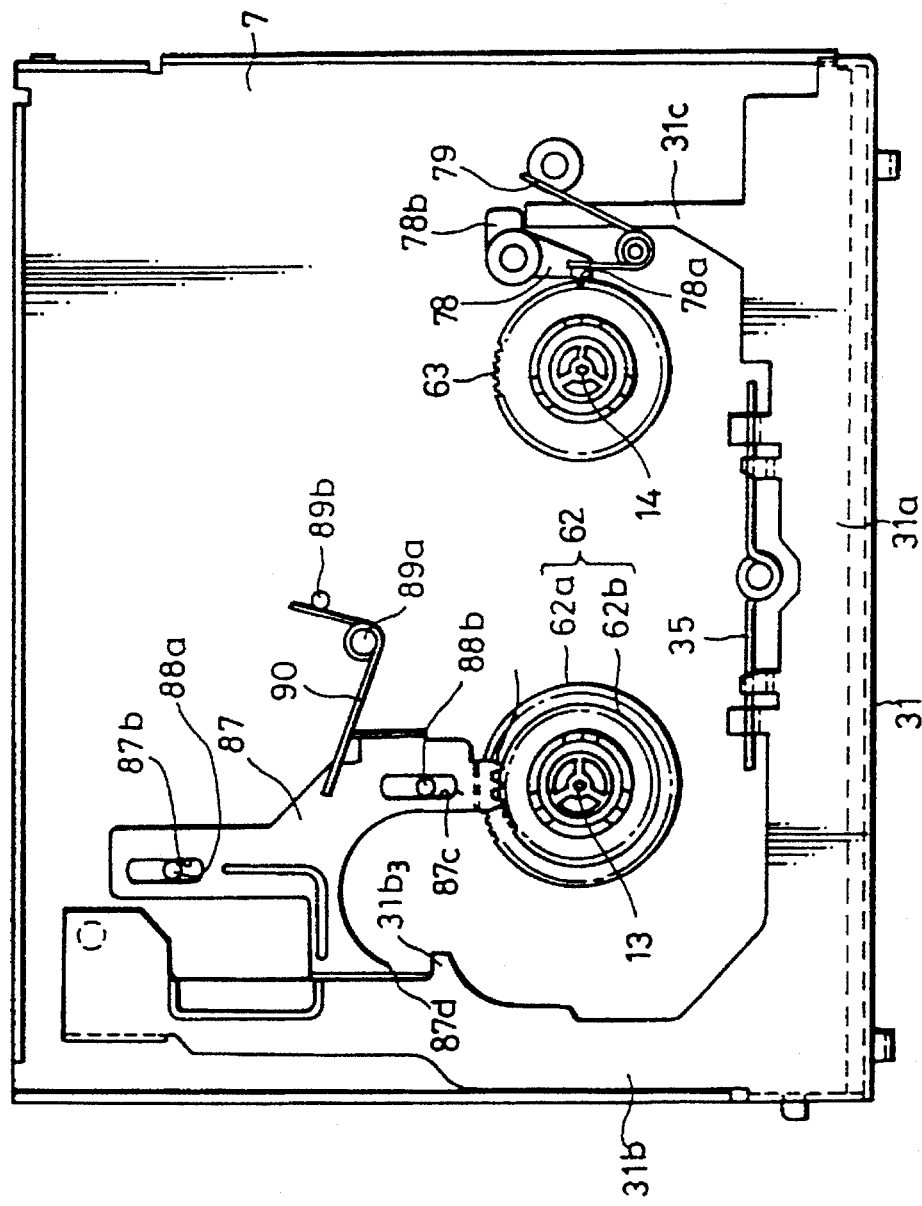
FIG. 16 is a plan view of the cassette tape player which is braked.
Figure 17:
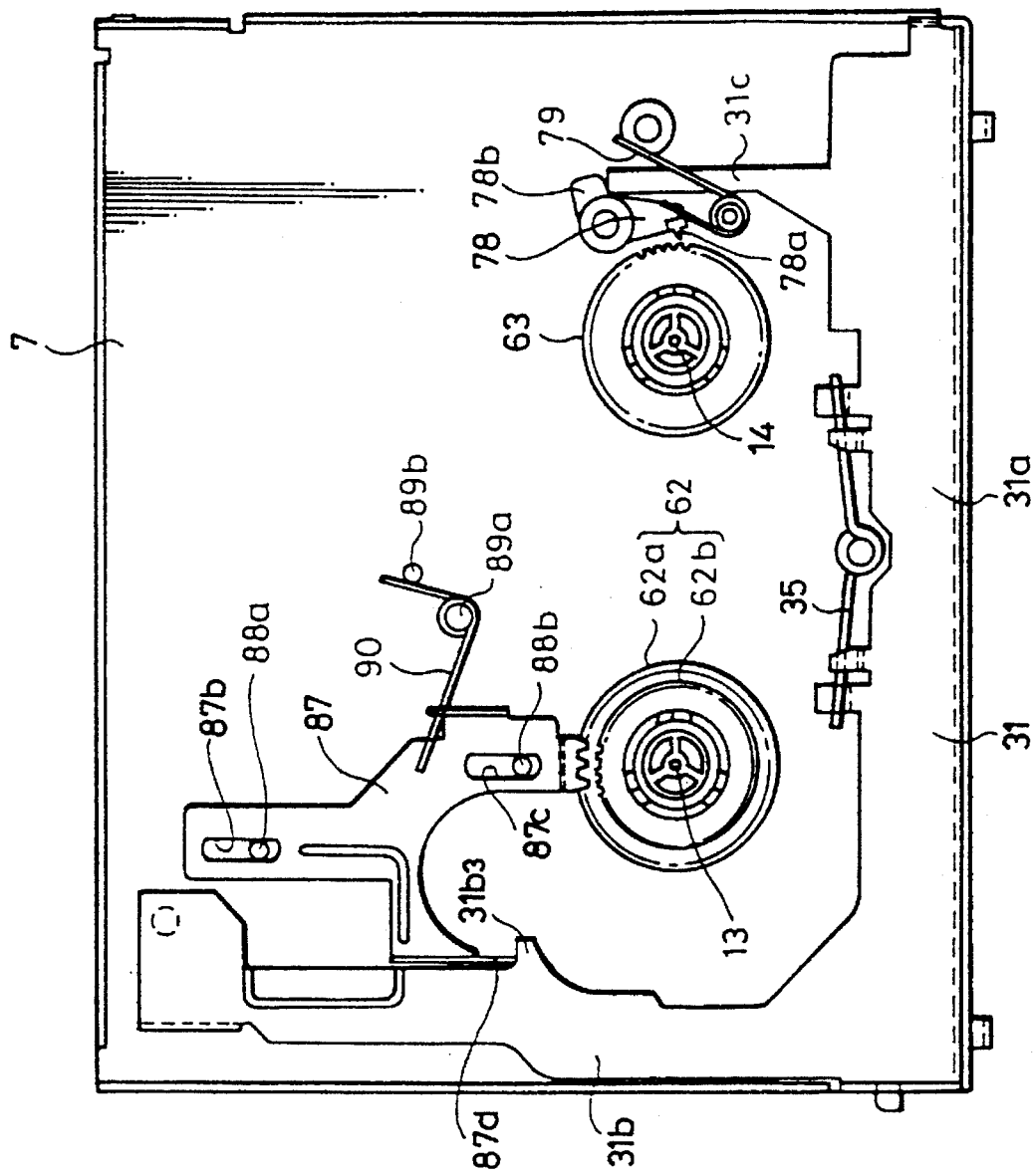
FIG. 17 is a plan view of the cassette tape player which is released in the tape loading condition.

As shown in FIGS. 15 through 17, a brake plate 87 is mounted on a left-hand side of a front portion of the main chassis 7 for sliding movement in the forward and backward directions.

Specifically, the brake plate 87 has engaging teeth 87a on a rear end thereof for meshing with the smaller-diameter gear 62 of the drive gear 62 of the supply hub drive shaft 13 on the subchassis 8 (the subchassis 8 is omitted from illustration in FIGS. 15 through 17). The brake plate 87 also has guide slots 87b, 87c defined in respective front and rear portions thereof and elongate in the forward and backward directions. Shaft pins 88a, 88b projecting on the main chassis 7 engage in the respective guide slots 87b, 87c to guide the brake plate 87 to slide in the forward and backward directions "a", "b" The brake plate 87 is normally urged to slide in the backward direction "b" by a torsion spring 90 supported on the main chassis 7 by shaft pins 89a, 89b. An engaging presser 87d is disposed on one side (left-hand side) of the brake plate 87 so as to correspond to the actuating tooth $31b_3$ on the vertical portion 31b of the first slide plate 31 on the subchassis 8.

As shown in FIGS. 4, 7, and 10–12, the attachment frame 16 of the lid 15 which is mounted on the front end of the main chassis 7 for rotation in the forward and backward directions has a stop 16c extending substantially perpendicularly inwardly from a lower edge of one side (left-hand side) 16b of the attachment frame 16. A pup-up spring 91 having a proximal end fixed to the main chassis 7 has a free end held against the lower surface of the stop 16c for normally urging the attachment frame 16 to move in the forward direction thereby to bias the lid 5 to be opened. The stop 16c is elevated to have its rear end facing the raised member $8f_2$ of the subchassis 8. When the subchassis 8 is slid in the forward direction with respect to the main chassis 7, the front end of the raised member $8f_2$ abuts against the stop 16c, preventing the subchassis 8 from being further slid in the forward direction. When the attachment frame 16 is rotated in the backward direction, i.e., when the lid 5 is turned in the closing direction, the stop 16c is lowered against the bias of the pop-up spring 91 until the stop 16c engages the main chassis 7, whereupon the subchassis 8 can slide in the forward direction without the raised member $8f_2$ engaging the stop 16c.

As shown in FIGS. 7 and 10–12, a lock plate 92 is rotatably mounted by a shaft pin 93 to an outer surface of a rear potion of the support plate 7b on one side (left-hand side) of the main chassis 7.

The lock plate 92 has a horizontal hook 92a for engaging the engaging tooth $31b_2$ on the first slide plate 31 on the subchassis 8, and a vertical hook 92b for engaging a lock member 94 attached to a rear end (free end) portion of one side (left-hand side) of the lid 5. The lock plate 92 is normally urged by a torsion spring 95 to turn in a direction to cause the hooks 92a, 92b to engage the engaging tooth $31b_2$ and the lock member 94, respectively. The torsion spring 95 has a coil portion supported on the shaft pin 93, an end engaging the main chassis 7, and an opposite end engaging the horizontal hook 92a.

When the lid 5 is closed, the vertical hook 92b engages the lock member 94 to keep the lid 5 closed. When the subchassis 8 is slid forward and the first slide plate 31 is further pushed, the engaging tooth $31b_2$ engages the hook 92a to hold the subchassis 8 and the first slide plate 31 in the pushed position.

The hook 92b has an engaging length "a" greater than an engaging length "b" of the hook 92a. When the subchassis 8 is slid forward while the lid 5 is being closed with the hook 92b engaging the lock member 94, the engaging tooth $31b_2$ hits the distal end of the hook 92a, turning the lock plate 92 counterclockwise in a direction to disengage the hook 92b from the lock member 94. However, the hook 92b remains in engagement with the lock member 94 even when the hook 92a rides on the engaging tooth $31b_2$, i.e., even when the hook 92a disengages from the engaging tooth $31b_2$. Therefore, the subchassis 8 is locked when it is pushed while the lid 5 is being locked in the closed position.

Operation of the tape player of the foregoing structure will be described below.

As shown in FIG. 6, the subchassis 8 is drawn, and the lid 5 is opened. As the lid 5 is opened, the cassette holder 15 is lifted. More specifically, upon opening movement of the lid 5, the attachment frame 16 is rotated, pulling the cam plates 19a, 19b slidingly forward, and the sliding movement of the cam plates 19a, 19b causes the edges of the cam holes 21a, 21b, 21c to elevate the shaft pins $25a_1$, $25a_2$, 25b projecting on the cassette holder 15. The cassette holder 15 is held in its uppermost position by the shaft pins $25a_1$, $25a_2$, 25b engaging respectively in the engaging holes $21a_3$, $21b_3$, $21c_3$ of the cam holes in the cam plates 19a, 19b.

Now, the tape cassette C is inserted from behind into the cassette holder 15. A cassette slider S is opened, opening hub drive shaft insertion holes and a front opening. At the same time, the lower edge of the front lid L confronts the lid openers 81a, 81b of the lid opening/tape holding member 81 fixed laterally between the front ends of the subchassis 8. When the lid 5 is turned in the closing direction, the cassette holder 15 with the inserted tape cassette C is lowered by the cam plates 19a, 19b. The tape cassette C is placed on the subchassis 8 with the hub drive shafts 13, 14 inserted respectively in the hub drive shaft insertion holes, and is positioned by the positioning pins 80a, 80b. The front lid L is pushed open in the upward direction by the lid openers 81a, 81b (see FIGS. 7 and 9). The tape T positioned in the front opening of the tape cassette C is prevented from being forced out forward by the tape holding surface portion 81c of the lid opening/tape holding member 81. Even when the tape cassette C is moved forward by sliding movement of the subchassis 8 in the forward direction, as described later on, the tape T is prevented from riding onto the rotary head cylinder 9 on the front end of the main chassis 7 by the tape holding surface portion 81c. Since the central area of the subchassis 8, i.e., the area around the hub drive shafts 13, 14, is formed as the land $8e_2$ which has substantially the same height as the thickness of the lower tongues 15c, 15d of the cassette holder 15 placed on the subchassis 8, the tape cassette C is stably placed on the subchassis 8 without gaps created therebetween.

In this condition, as shown in FIG. 2, the inlet and outlet guide rollers 36, 37 supported on the front end of the second slide plate 32, the rocking guide rollers 44, 45 supported on the respective rocking levers 41, 42, and the guide roller 55 and the slanted guide 56 disposed on the guide base 57 coupled to the second slide plate 32 are positioned within the front opening of the tape cassette C, i.e., inwardly of the tape T. The cassette holder 15 is integrally coupled to the subchassis 8 by the shaft pins 25a, 25b engaging in the respective recesses 26a, 26b of the subchassis 8 (see FIG. 7).

The tape T is then loaded by pushing the front panel 6 to slide the subchassis 8 forward against the resiliency of the return spring 100 that engages between the subchassis 8 and the main chassis 7.

The tape loading operation will be described below with reference to FIGS. 18A through 18D. In FIGS. 18A through 18D, the rocking lever 42 in the outlet region is omitted from illustration as it is symmetrical in shape and identical in operation to the rocking lever 41 in the inlet region.

Figure 18C:
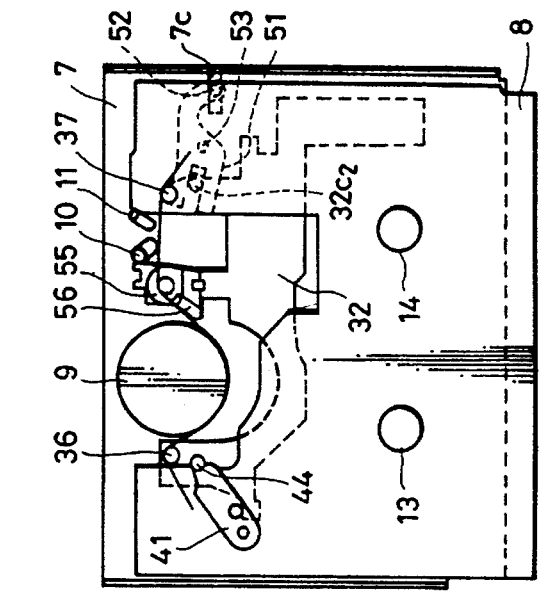
FIG. 18C is a view illustrative of a condition of the cassette tape player in which the subchassis has moved further forward.
Figure 18D:
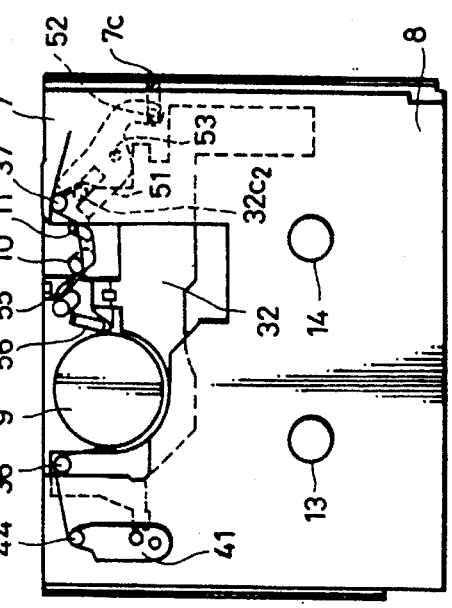
FIG. 18D is a view illustrative of a condition of the cassette tape player in which the subchassis has moved still further forward with the tape loading completed.
Figure 18A:
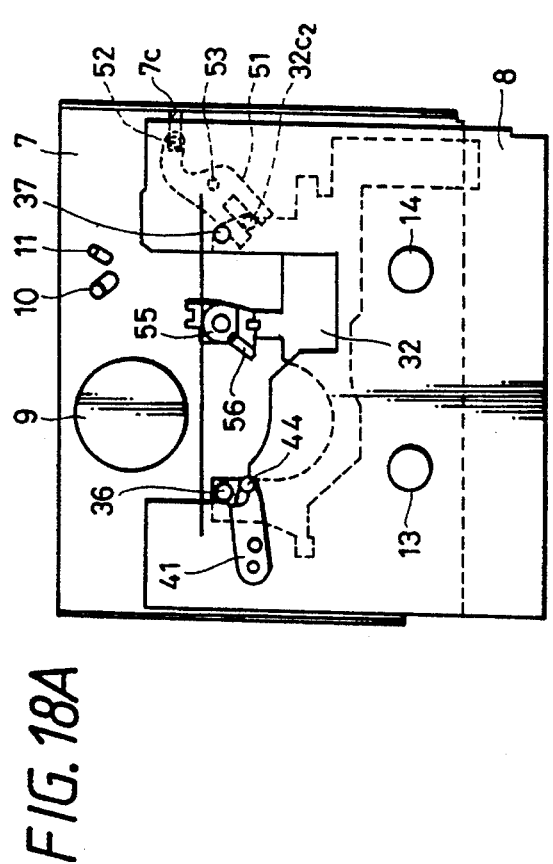
FIG. 18A is a view illustrative of the tape unloading condition of the cassette tape player.

FIG. 18A shows the parts prior to the tape loading operation, i.e., the parts with the tape unloaded, which are in the same position as those in FIG. 2.

Figure 18B:
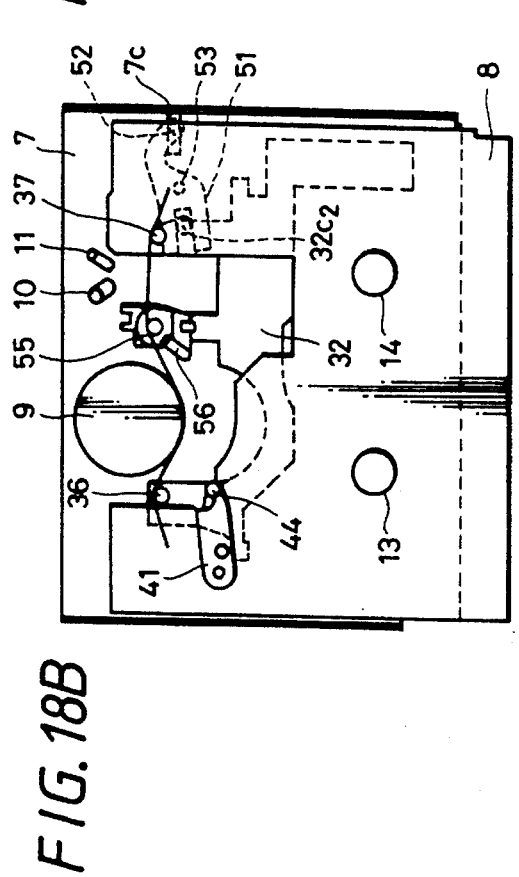
FIG. 18B is a view illustrative of a condition of the cassette tape player in which the subchassis has moved forward.

When the subchassis 8 is pushed forward, the displacement amplifying lever 51 supported on the subchassis 8 by the shaft pin 53 is also moved forward in unison with the subchassis 8, as shown in FIG. 18B. Since the guide pin 52 on an end of the displacement amplifying lever 51 engages in the slit 7c in the main chassis 7, the displacement amplifying lever 51 is rotated forward about the guide pin 52. The rotation of the displacement amplifying lever 51 causes the hook 51a to engage and push forward the tubular projection $32c_2$ the second slide plate 32. The second slide plate 32 is pushed more forward than the subchassis 8, i.e., the second slide plate 32 is moved a distance greater than the distance by which the subchassis 8 is moved. In this embodiment, the distance by which the second slide plate 32 is moved is about twice the distance by which the subchassis 8 is moved.

In this condition, the rocking lever 41 has not yet started to rotate.

As the subchassis 8 slides further forward, as shown in FIG. 18C, the tape cassette C also moves forward, and the tape T is pulled out forward by the guide rollers 36, 37, 55 by the amplified forward movement of the second slide plate 32.

The rocking lever 41 now starts to be pushed forward and rotated by the amplified forward movement of the second slide plate 32. At this time, the rocking guide roller 44 moves through the path of the linearly moving guide roller 36 on the second slide plate 32. However, the rocking guide roller 44 does not impinge upon the guide roller 36 because the guide roller 36 has already advanced forward.

As shown in FIG. 18D, when the subchassis 8 is moved forward its full stroke, the rocking lever 41 is fully rotated and kept in the vertical position, and the second slide plate 32 is moved to the front end of its stroke. The tape T is therefore largely pulled out by the guide rollers 44, and wound around the rotary head cylinder 9 by the inlet guide roller 36 and the guide roller 55 which is inclined near the rotary head cylinder 9. The tape loading operation is now completed.

At this time, as shown in FIG. 8, the tape cassette C is positioned with its front lid L lying over the rotary head cylinder 9, i.e., with the rotary head cylinder 9 placed in the tape cassette C. The depth of the entire tape player is therefore relatively small.

The guide rollers 36, 55 are moved linearly with respect to the rotary head cylinder 9. In this embodiment, the rotary head cylinder 9 has a diameter of 17 mm, and the tape T is wound around the rotary head cylinder 9 at an angle of 162°.

With the tape loading operation completed, as shown in FIG. 3, the guide rollers 36, 55 which wind the tape T around the rotary head cylinder 9 are positioned such that the attachment shaft 36a of the guide roller 36 is held against the stopper 12 on the front end of the main chassis 7, and the flanged shaft extension $55a_1$ of the attachment shaft 55a of the guide roller 55 is held against the front end of the guide groove 60.

The outlet guide roller 37 has moved outwardly of the inclined roller guide 10 and the inclined guide 11 that are positioned on the front end of the main chassis 7, thereby giving appropriate tension to the tape T.

While the tape is being thus pulled out, as shown in FIG. 15, the supply hub drive shaft 13 is free to rotate because the engaging teeth 87a of the brake plate 87 are spaced from the drive gear 62, and the takeup hub drive shaft 14 is locked because the engaging teeth 78a of the brake plate 78 are held in mesh with the drive gear 63. Therefore, the tape T is supplied only from the supply hub, causing no errors with respect to playback and recording starting positions.

Before the subchassis 8 reaches its predetermined position, as shown in FIG. 16, the engaging teeth 87a of the brake plate 87 brought into mesh with the smaller-diameter gear 62b of the drive gear 62 coupled to the supply hub drive shaft 13, thus locking the smaller-diameter gear 62b, imposing a load torque on the larger-diameter gear 62a coupled to the drive shaft 13 thereby to brake the drive shaft 13. Therefore, the tape T is wound around the rotary head cylinder 9 under a given condition.

When the first slide plate 31 is pushed in against the bias of the torsion spring 35, the engaging tooth $31b_2$ engages the hook 92a of the lock plate 92 to lock the first slide plate 31 with respect to the main chassis 7 (see FIG. 10), for thereby securing the subchassis 8. At this time, as shown in FIG. 17, since the first slide plate 31 is further slid with respect to the subchassis 8, the brake plate 87 is engaged and pushed by the actuating tooth $31b_3$ of the first slide plate 31. The engaging teeth 87a of the brake plate 87 are brought out of mesh with the smaller-diameter gear 62b of the drive gear 62, freeing the supply hub drive shaft 13 for rotation. At the same time, the engaging portion 78b of the brake lever 78 is pushed by the presser 31c of the first slide plate 31, turning the brake lever 78 to move the engaging tooth 78a out of mesh with the drive gear 63, which is now free to rotate. The drive forces from the hub drive motor 82 are transmitted to the drive shaft 13 or 14 or the drive gear 62 or 63 through the transmission gear 85 and the switching mechanism to rotate the drive shaft 13 or 14 or the drive gear 62 or 63 for thereby transporting the tape T to record or reproduce information.

To unload the tape cassette C, the above operation is reversed. More specifically, the first slide plate 31 is unlocked from the lock plate 92, and the subchassis 8 is slid backward under the bias of the return spring.

As the subchassis 8 slides backward, the guide rollers are retracted, and the first double gear 68 of the tape rewinding mechanism is rotated by the smaller-diameter toothed portion 68b held in mesh with the rack 86 on the main chassis 7. The rotation of the first double gear 68 is transmitted through the larger-diameter toothed portion 68a to the second double gear 69. When the second double gear 69 rotates, friction is generated between the second double gear 69 and the lever 66 because of the spring portion 66b (see FIGS. 5 and 13). The lever 66 is rotated inwardly about the shaft 67 to bring the larger-diameter gear 69b of the second double bear 69 into mesh with the smaller-diameter gear 62b coupled to the supply hub drive shaft 13. The rotation of the first double gear 68 is now transmitted through the second double gear 69 to the supply hub drive shaft 13 to rotate the supply hub drive shaft 13 in a direction to rewind the tape T. The tape T which has been drawn out by the guide rollers is rewound and stored in the tape cassette C.

Since the first slide plate 31 is moved more backward with respect to the subchassis 8 than in the tape loading operation, the lever 66 locked against inward rotation by the actuating tooth $31b_3$ is released, allowing the second double gear 69 and the drive gear 62 to mesh with each other unobstructedly.

During the tape loading operation and upon completion of the tape loading operation, the actuating tooth $31b_3$ of the first slide plate 31 engages and pushes forward the engaging member 66a of the lever 66. Therefore, the lever 66 is held in an outwardly turned position, and the second double gear 69 is kept out of mesh with the drive gear 62 of the supply hub drive shaft 13.

The subchassis 8 is slid backward in the manner described above. While the subchassis 8 is being slid backward, since the larger-diameter gear 69b of the second double gear 69 meshes with the damper gear 77, the subchassis 8 and the supply hub drive shaft 13 are damped against quick sliding movement and quick rotation, respectively.

When the lid 5 is opened after the subchassis 8 has slid backward with its rear portion projecting from the front side 3b of the storage casing 3, the cassette holder 15 is elevated in ganged relationship to the lid 5, drawing the tape cassette C backward.

In the above tape loading and unloading operations, the lid 5 can be opened and closed to allow the cassette holder 51 to be elevated and lowered only when the subchassis 8 is retracted. Consequently, the tape T in the tape cassette C is prevented from riding on and being caught by the rotary head cylinder 9 and the guide rollers.

While a preferred embodiment has been described above, the present invention is not limited to the illustrated embodiment, but various changes and modifications may be made therein without departing from the scope of the invention.

The present invention is applicable to various tape players with rotary heads such as a video tape recorder.

As described above, the recording, reproducing, and recording/reproducing apparatus according to the present invention effects tape loading and unloading operations manually, and hence does not need a drive motor for the tape loading and unloading operations. Therefore, the number of constituent parts of the apparatus may be reduced, the structure of the apparatus may be simplified, and the size and cost of the apparatus may be reduced.

The tape cassette can be positioned and held stably for reliably recording and reproducing information.

In the tape loading operation, the opened lid of the tape cassette and the openers for opening the lid are positioned in overlying relationship to the rotary head cylinder. Therefore, the tape cassette can be positioned closely to the rotary head cylinder, i.e., with the rotary head cylinder entering the tape cassette, so that the depth of the entire apparatus is relatively small. Accordingly, the recording, reproducing, and recording/reproducing apparatus may be small in size.

What is claimed is:

1. A recording and/or reproducing apparatus for a tape housed in a tape cassette, comprising a main chassis with a rotary head cylinder mounted thereon, a subchassis coupled to said main chassis for sliding movement relative to the main chassis in directions toward and away from the rotary head cylinder, said subchassis having a pair of hub drive shafts and a plurality of guide rollers movable relative to said main chassis along with said subchassis, a lid mounted to said main chassis and being angularly movable with respect to said main chassis, a cam plate connected to said lid and slidable towards or away from the rotary head cylinder by angular movement of said lid with respect to said main chassis, said cam plate having an inclined first cam groove and a second cam groove contiguous to said inclined first cam groove and extending parallel to a direction in which said subchassis and said main chassis slide with respect to each other, a vertical cam groove formed in the main chassis, and a tape holder mounted to said main chassis and said cam plate via a shaft pin riding in said vertical cam groove, said inclined first cam groove, and said second cam groove, said tape holder being vertically moveable with respect to said subchassis when said cam plate is slidably moved with respect to said main chassis, said tape holder being moved to a lowered position whereat said plurality of guide rollers are positioned inboard of the tape when said subchassis is moved toward said rotary head cylinder, wherein the tape housed in the tape cassette loaded on said subchassis is pulled out of the tape cassette and wound around said rotary head cylinder by said guide rollers when said subchassis undergoes sliding movement relative to said main chassis.

2. A recording and/or reproducing apparatus according to claim 1, wherein said guide rollers are movable to a predetermined position on said main chassis by sliding movement of said subchassis.

3. A recording and/or reproducing apparatus according to claim 1, further comprising a first slide member and a second slide member which are disposed on said subchassis, said guide rollers being mounted on said second slide member, said first slide member and said second slide member being slidable upon sliding movement of said subchassis.

4. A recording and/or reproducing apparatus according to claim 3, further comprising means on said subchassis for increasing sliding movement of said second slide member with respect to sliding movement of said subchassis.

5. A recording and/or reproducing apparatus according to claim 3, wherein said first slide member has a tape holding member for preventing the tape in the tape cassette loaded on said subchassis from riding onto said rotary head cylinder.

6. A recording and/or reproducing apparatus according to claim 5, wherein said tape holding member has opening means for opening a lid of the tape cassette.

7. A recording and/or reproducing apparatus according to claim 3, further comprising a pair of rocking levers mounted to said subchassis and being angularly movable by engagement with said second slide member when said second slide member undergoes sliding movement, said rocking levers having respective different tape guides.

8. A recording and/or reproducing apparatus according to claim 3, wherein one of said pair of hub drive shafts comprises a supply hub drive shaft and further comprising a tape rewinding mechanism disposed between said main chassis and said subchassis and including a first gear element mounted on said main chassis engaged with a second gear element mounted on said subchassis, said second gear element rotating said supply hub drive shaft in a direction to rewind the tape in response to the sliding movement of said main chassis and said subchassis in a tape unloading operation, whereby the tape is returned to the tape cassette.

9. A recording and/or reproducing apparatus according to claim 8, wherein said tape rewinding mechanism comprises a rack mounted on said main chassis, a first gear meshing with said rack, and a rocking gear rockable in response to rotation of said first gear based on the direction in which said first gear rotates, for meshing with a second gear coupled to said supply hub drive shaft.

10. A recording and/or reproducing apparatus according to claim 9, further comprising a damper mechanism, said rocking gear engaging said damper mechanism.

11. A recording and/or reproducing apparatus according to claim 3, further comprising an urging member for urging said subchassis in a direction to discharge the tape cassette.

12. A recording and/or reproducing apparatus according to claim 1, wherein said subchassis has a tape holding member for preventing the tape in the loaded tape cassette from riding onto said rotary head cylinder.

13. A recording and/or reproducing apparatus according to claim 1, wherein one of said pair of hub drive shafts comprises a supply hub drive shaft and further comprising a tape rewinding mechanism disposed between said main chassis and said subchassis for rotating said supply hub drive shaft in a direction to rewind the tape in response to the sliding movement of said main chassis and said subchassis in a tape unloading operation, whereby the tape is returned to the tape cassette.

14. A recording and/or reproducing apparatus according to claim 1, further comprising a brake mechanism disposed between said main chassis and said subchassis for braking said subchassis while the subchassis is sliding and releasing said subchassis after the sliding movement of the subchassis is completed.

15. A recording and/or reproducing apparatus for a tape recording medium housed in a tape cassette, comprising a main chassis with a rotary head cylinder mounted thereon, a subchassis coupled to said main chassis for sliding movement relative to the main chassis in directions toward and away from the rotary head cylinder, said subchassis having a pair of hub drive shafts and a plurality of guide rollers movable in a predetermined direction, a holder for holding the tape cassette, a frame with a lid member attached thereto, said frame being angularly movably mounted on said main chassis, and a cam plate connected to said frame and being slidably mounted to said subchassis, said cam plate undergoing sliding movement when said frame undergoes angular movement with respect to said main chassis, said cam plate having an inclined first cam groove and a second cam groove contiguous to said inclined first cam groove and extending parallel to a direction in which said subchassis and said main chassis slide with respect to each other, said main chassis having a vertical cam groove, said holder having a shaft engaging in said inclined first cam groove, said second cam groove, and said vertical cam groove, said holder being vertically moveable with respect to said subchassis when said cam plate is slidably moved with respect to said main chassis, said holder being moved to a lowered position when said subchassis is moved toward said rotary head cylinder, said holder being slidable with said subchassis when the holder is in said lowered position.

16. A recording and/or reproducing apparatus according to claim 15, further comprising means for integrally coupling said holder and said subchassis to each other when said holder is in the lowered position.

17. A recording and/or reproducing apparatus according to claim 16, wherein said means for integrally coupling comprises an engaging projection mounted on either one of said holder and said subchassis and an engaging recess defined in the other of said holder and said subchassis.

18. A recording and/or reproducing apparatus according to claim 15, wherein said holder has an engaging member for preventing the tape cassette held by said holder from being mounted and dismounted while said holder is sliding in unison with said subchassis relatively to said main chassis.

19. A recording and/or reproducing apparatus according to claim 15, further comprising a single lock mechanism including a hook mounted to the main chassis adapted to stop movement of the subchassis for locking said subchassis and said holder to said main chassis in a position in which the sliding movement of the subchassis and the holder is completed.

20. A recording and/or reproducing apparatus for a tape recording medium housed in a tape cassette having a lid for closing a front side of the tape cassette, comprising a main chassis with a rotary head cylinder mounted thereon, a subchassis coupled to said main chassis for sliding movement relative to the main chassis in directions toward and away from the rotary head cylinder, said subchassis having a pair of hub drive shafts for engaging a pair of hubs of the tape cassette, opening means for opening the lid of the tape cassette, a plurality of guide rollers mounted to said subchassis movable in a predetermined direction, a holder for holding the inserted tape cassette, a frame to which a housing lid is attached, said frame being angularly movably mounted on said main chassis, and a cam plate connected to said frame and being slidably mounted to said subchassis, said cam plate undergoing sliding movement when said frame undergoes angular movement with respect to said main chassis, said cam plate having an inclined first cam groove and a second cam groove contiguous to said inclined first cam groove and extending parallel to a direction in which said subchassis and said main chassis slide with respect to each other, said main chassis having a vertical cam groove, said holder having a shaft engaging in said inclined first cam groove, said second cam groove, and said vertical cam groove, said holder being vertically moveable with respect to said subchassis when said cam plate is slidably moved with respect to said main chassis, said holder being moved to a lowered position when said subchassis is moved toward said rotary head cylinder, said holder being slidable with said subchassis when the holder is in said lowered position, wherein when the holder is lowered, the lid of said tape cassette is opened by said opening means, and the tape is pulled from a front opening of the tape cassette in said holder and wound around said rotary head cylinder by moving said guide rollers with a guide roller movement means connected to said guide rollers and said subchassis in response to relative sliding movement of said main chassis and said subchassis.

21. A recording and/or reproducing apparatus according to claim 20, further comprising a first slide member and a second slide member which are disposed on said subchassis, said guide rollers being mounted on said second slide member, said first slide member and said second slide member being slidable upon sliding movement of said subchassis.

22. A recording and/or reproducing apparatus according to claim 21, further comprising means on said subchassis for increasing sliding movement of said second slide member with respect to sliding movement of said subchassis.

23. A recording and/or reproducing apparatus according to claim 21, further comprising means for integrally coupling said holder and said subchassis to each other when said holder is in the lowered position.

24. A recording and/or reproducing apparatus according to claim 23, wherein said means for integrally coupling comprises an engaging projection mounted on either one of said holder and said subchassis and an engaging recess defined in the other of said holder and said subchassis.

25. A recording and/or reproducing apparatus for a tape recording medium housed in a tape cassette having a lid for closing a front side of the tape cassette, comprising a main chassis with a rotary head cylinder mounted thereon, a subchassis coupled to said main chassis for sliding movement relative to the main chassis in directions toward and away from the rotary head cylinder, said subchassis having a pair of hub drive shafts for engaging a pair of hubs of the tape cassette, an opening member disposed upstream in a direction parallel to a straight line interconnecting said hub drive shafts, for opening the lid of the tape cassette, a plurality of guide rollers movable linearly, a holder for holding the inserted tape cassette, a frame to which a housing lid is attached, said frame being angularly movably mounted on said main chassis, and a cam plate connected to said frame and being slidably mounted to said subchassis, said cam plate undergoing sliding movement when said frame undergoes angular movement with respect to said main chassis, said cam plate having an inclined first cam groove and a second cam groove contiguous to said inclined first cam groove and extending parallel to a direction in which said subchassis and said main chassis slide with respect to each other, said main chassis having a vertical cam groove, said holder having a shaft engaging in said inclined first cam groove, said second cam groove, and said vertical cam groove, said holder being vertically moveable with respect to said subchassis when said cam plate is slidably moved with respect to said main chassis, said holder being moved to a lowered position when said subchassis is moved toward said rotary head cylinder, said holder being slidable with said subchassis when the holder is in said lowered position, wherein when the holder is lowered, the lid of said tape cassette is opened by said opening member, the opened lid is positioned between said opening member and said holder, the tape is pulled from a front opening of the tape cassette in said holder and wound around said rotary head cylinder by moving said guide rollers with a guide roller movement means connected to said guide rollers and said subchassis in response to relative sliding movement of said main chassis and said subchassis, and the lid of the tape cassette and the opening member are disposed in overlying relationship to said rotary head cylinder while the tape is being wound around the rotary head cylinder.

26. A recording and/or reproducing apparatus according to claim 25, wherein said opening member is mounted on said subchassis upstream of said holder in the directions in which the subchassis is slidable.

* * * * *